United States Patent [19]
Blanchard et al.

[11] Patent Number: 5,416,900
[45] Date of Patent: May 16, 1995

[54] PRESENTATION MANAGER

[75] Inventors: William B. Blanchard, Cambridge, Mass.; Jonathan P. Booth, Portsmouth, N.H.; Jennifer Memhard, Natick, Mass.

[73] Assignee: Lotus Development Corporation, Cambridge, Mass.

[21] Appl. No.: 35,570

[22] Filed: Mar. 23, 1993

Related U.S. Application Data

[63] Continuation of Ser. No. 691,479, Apr. 25, 1991, abandoned.

[51] Int. Cl.⁶ .............................. G06F 15/20
[52] U.S. Cl. ........................ 395/155; 395/146; 395/148; 345/112; 345/118; 345/156
[58] Field of Search .............. 340/721, 724, 706, 709, 340/723, 710; 395/155, 156, 157, 159, 131, 148, 147, 146; 345/113, 115, 116, 118, 121, 145, 146

[56] References Cited

U.S. PATENT DOCUMENTS

| | | | |
|---|---|---|---|
| 4,723,210 | 2/1988 | Barker et al. | 395/147 |
| 4,723,211 | 2/1988 | Barker et al. | 395/147 |
| 4,800,510 | 1/1989 | Vinberg et al. | 340/721 |
| 4,815,029 | 3/1989 | Barker et al. | 395/147 |
| 5,001,654 | 3/1991 | Winiger et al. | 395/148 |
| 5,060,135 | 10/1991 | Levine et al. | 364/200 |

OTHER PUBLICATIONS

K. Nelson, et al, Using Lotus Manuscript TM, Mar. 30, 1987, pp. 17–18, 34–36, 61–74, 81–88, 314–321.
Lisa Draw, 1984, pp. 8–17, 36–43, 50–55, 88–115.
Aldus Persuasion, Program created by Peter Polash, User Manual, 1988 (selected portions).

Primary Examiner—Tommy P. Chin
Assistant Examiner—A. Au
Attorney, Agent, or Firm—Fish & Richardson

[57] ABSTRACT

A presentation manager including a module for representing a graphical object on a page, the graphical object having a size and a placement on said page; a module for representing a container object that is associated with the page, the container object having a set of specified characteristics; a module for dragging the graphical object to another location on the page; and a module for linking the graphical object to the container object when the graphical object is dragged into the container object, wherein the linking module creates an active link to the container object when the graphical object is dragged into the container object, wherein the active link imposes the set of specified characteristics on the graphical object.

20 Claims, 23 Drawing Sheets

```
    void AddObject( PGPAGE pPage, INT ObjectType )     ⟋252
    {
          PGOBJECT pObj,pNewObj;

UNUSED( ObjectType );
254 ──── pNewObj = (PGOBJECT) myAlloc( sizeof(GOBJECT) );
255 ──── if (!pNewObj) return;
256 ──── pNewObj->ObjectType = ObjectType;
257 ──── SetRect( &pNewObj->ObjectDim, 20, 20, 100, 100 );
258 ──── pNewObj->ObjectSelected = TRUE;

259 ──── DeselectAllObjects( pPage );

260 ──── if (pPage->FirstObject){
  261 ────   pObj = pPage->FirstObject;
  262 ────   while (pObj->NextObject) pObj = pObj->NextObject;
  263 ────   pObj->NextObject = pNewObj;
        }
  264 ── else pPage->FirstObject = pNewObj;

265 ── PBObjectEdited( pInst, pPage, pNewObj );
  266 ── InvalidateRect( pInst->hWnd, NULL, TRUE );
    }
```

FIG. 4

```
    void DeleteSelectedObjects( PGPAGE pPage )     ⟋270
    {
          PGOBJECT pObj,pNextObj;

272 ──── pObj = GetSelectedObject( pPage, NULL );
273 ──── PBObjectEdited( pInst, pPage, pObj );
274 ──── UnlinkObj( pPage, pObj, FALSE );
275 ──── DelObject( &pPage->FirstObject, pObj );

```
                                                            ┌280
     void SetTextAttrib( PGPAGE pPage, WORD i )
     {
            PGOBJECT pObj;
            WORD size = 0;
281 ──▶    WORD face = 0;
            BOOL bSize = FALSE;

282 ──▶    switch( i ){
                case IDM_SSMALL:    size = 1;       break;
                case IDM_SMEDIUM:   size = 24;      break;
                case IDM_SLARGE:    size = 32;      break;
                case IDM_FROMAN:    face = FF_ROMAN;    break;
                case IDM_FSWISS:    face = FF_SWISS;    break;
                case IDM_FMODERN:   face = FF_MODERN;   break;
                case IDM_FDEFAULT:  face = 0;  break;
            }
283 ──── if (size) bSize = TRUE;
284 ──── if (size==1) size = 0;

285 ──── pObj = GetSelectedObject( pPage, NULL );
286 ──── if (bSize) pObj->ObjectInfo[0] = size;
287 ──── else pObj->ObjectInfo[1] = face;
288 ──── PBObjectEdited( pInst, pPage, pObj );

```
      void AssignMaster( PGPAGE pPage, WORD n )
      {
            PGPAGE pMPage;
            WORD i;

302 ─── if (n <= 0){
304 ───        pPage->MasterPage = NULL;
306 ───        pPage->OutofDate = TRUE;
308 ───        BuildTables( pPage );
310 ───        return;
            }
312 ─── pMPage = pInst->MasterPages;
314 ─── for( i=1; i<n; i++ ){
                  pMPage = pMPage->NextPage;
                  if (!pMPage) return;
            }
316 ─── pPage->MasterPage = pMPage;
318 ─── pPage->OutofDate = TRUE;
320 ─── BuildTables( pPage );
      }
```

```
        void BuildTables( PGPAGE pPage )          330
        {
332 ──── INT nPB = 0;
334 ──── INT nMTB = 0;
336 ──── PGOBJECT pObj;
338 ──── PGPAGE pmaster = pPage->MasterPage;

340 ──── FreeTables( pPage );
342 ──── pPage->OutofDate = FALSE;
344 ──── if (!pmaster) return;

346 ──── pObj = pmaster->FirstObject;
348 ──── while( pObj ){
                if (pObj->ObjectType == OT_PLACEBLOCK) nPB++;
                if (pObj->ObjectType == OT_MTEXTBLOCK) nMTB++;
                pObj = pObj->NextObject;
        }

356 ──── pPage->PBTable = myAlloc( (nPB+1) * sizeof( PBTABLE ));
358 ──── pPage->nPB = nPB;
360 ──── pPage->MTBTable = myAlloc( (nMTB+1) * sizeof( PBTABLE ));
362 ──── pPage->nMTB = nMTB;
```

FIG. 8a

```
364 ──  nPB = 0;
366 ──  nMTB = 0;
368 ──  pobj = pmaster->FirstObject;
370 ──  while( pobj ){
372 ──      if (pobj->ObjectType == OT_PLACEBLOCK){
374 ──          nPB++;
376 ──          pPage->PBTable[ nPB ].pPBObj = pobj;
378 ──          pPage->PBTable[ nPB ].PBRect = pobj->objectDim;
380 ──          pPage->PBTable[ nPB ].pPBPage = pmaster;
            }
382 ──      if (pobj->ObjectType == OT_MTEXTBLOCK){
384 ──          nMTB++;
386 ──          pPage->MTBTable[ nMTB ].pMTBObj = pobj;
                pPage->MTBTable[ nMTB ].MTBRect = pobj->ObjectDim;
388 ──          pPage->MTBTable[ nMTB ].pMTBPage = pmaster;
            }
390 ──      pobj = pobj->NextObject;
        }
392 
393 ──  pobj = pPage->FirstObject;
394 ──  while( pobj ){
395 ──      if (pobj->PB_id != 0){
396 ──          PBLink( pPage, pobj, pobj->PB_id & (~DORMANT_FLAG));
            }
397 ──      if (pobj->MTB_id != 0){
398 ──          MTBLink( pPage, pobj, pobj->MTB_id & (~DORMANT_FLAG));
            }
            pobj = pobj->NextObject;
        }
```

FIG. 8b

```
       void FreeTables( PGPAGE pPage )
       {
              PGOBJECT pObj;
402 ——— if (!pPage->PBTable && !pPage->MTBTable) return;
404 ——— pObj = pPage->FirstObject;

406 ———while( pObj ){
   408 ————— UnlinkObj( pPage, pObj, TRUE );
              pObj = pObj->NextObject;
           }
412 ——— if (pPage->PBTable){
       414—— myFree( pPage->PBTable );
        416— pPage->PBTable = NULL;
       418——— pPage->nPB = 0;
           }
420 ——— if (pPage->MTBTable){
       422——— myFree( pPage->MTBTable );
        424 — pPage->MTBTable = NULL;
        426— pPage->nMTB = 0;
           }
       }
```

FIG. 9

```
void PBLink( PGPAGE pPage, PGOBJECT pObj, INT index )     ⌐430
{
432 ———if (index > pPage->nPB) return;
434 ———UnlinkObj( pPage, pObj, FALSE );
436 ———pPage->PBTable[ index ].pLocObj = pObj;
438 ———pObj->PB_id = index;
440 ———PBResizeObject( pPage, pObj );
}
```

FIG. 10

```
void PBResizeObject( PGPAGE pPage, PGOBJECT pObj )     ⌐446
{
    PGOBJECT pPBObj;

pPBObj = pPage->PBTable[ pObj->PB_id ].pPBObj;
    pObj->ObjectDimensions = pPBObj->ObjectDimensions;
}
```

FIG. 11

```
void MTBLink( PGPAGE pPage, PGOBJECT pObj, INT index )    ╱─450
{
        if (index > pPage->nMTB) return;
        UnlinkObj( pPage, pObj, FALSE );
        pPage->MTBTable[ index ].pLocObj = pObj;
        pObj->MTB_id = index;
460 ─── MTBCopyInfoToObject( pPage, pObj );
}
```

FIG. 12

```
void MTBCopyInfoToObject( PGPAGE pPage, PGOBJECT pObj )    ╱─466
{
        PGOBJECT pPBObj;

pPBObj = pPage->MTBTable[ pObj->MTB_id ].pPBObj;
        pObj->ObjectDimensions = pPBObj->ObjectDimensions;
        pObj->ObjectInfo[0] = pPBObj->ObjectInfo[0];
        pObj->ObjectInfo[1] = pPBObj->ObjectInfo[1];
}
```

FIG. 13

```
void Unlinkobj( PGPAGE pPage, PGOBJECT pobj, BOOL makeDormant )
{
    INT index;

482 ——index = pobj->PB_id;
484 ——if (index){
486 ——    if (makeDormant)
488 ——        pobj->PB_id = pobj->PB_id | DORMANT_FLAG;
         else
490 ——        pobj->PB_id = 0;
492 ——    if (!(index & DORMANT_FLAG) && index <= pPage->nPB)
494 ——        pPage->PBTable[ index ].pLocObj = NULL;
    }
496 ——index = pobj->MTB_id;
498 ——if (index){
         if (makeDormant)
             pobj->MTB_id = pobj->MTB_id | DORMANT_FLAG;
         else
             pobj->MTB_id = 0;
         if (!(index & DORMANT_FLAG) && index <= pPage->nMTB)
             pPage->MTBTable[ index ].pLocObj = NULL;
    }
}
```

FIG.14

```
case WM_LBUTTONDOWN:                            500
502 — if (pInst->HasCapture) break;
504 — pt = MAKEPOINT( lParam );
506 — if (!GetHitObject( pInst->CurrPage, pt )) break;
508 — SetCapture( hWnd );
510 — SetCursor( LoadCursor( NULL, IDC_CROSS ));
512 — pInst->HasCapture = TRUE;
514 — hDC = GetDC( hWnd );
516 — PaintIntransitObjects( hDC, pInst->CurrPage );
518 — ReleaseDC( hWnd, hDC );
520 — break;
```

FIG. 15

```
case WM_MOUSEMOVE:                              530
532 — if (!pInst->HasCapture) break;
534 — pt = MAKEPOINT( lParam );
536 — hDC = GetDC( hWnd );
538 — PaintIntransitObjects( hDC, pInst->CurrPage );
540 — MoveIntransitObjects( pInst->CurrPage, pt );
542 — PaintIntransitObjects( hDC, pInst->CurrPage );
544 — hit = PBLightHit( hDC, pInst->CurrPage, pt, TRUE );
546 — hit = MTBLightHit( hDC, pInst->CurrPage, pt, (hit == 0) );
548 — ReleaseDC( hWnd, hDC );
550 — break;
```

FIG. 16

```
                                                                    560
case WM_LBUTTONUP:
562 — if (!pInst->HasCapture) break;
564 — SetCursor( LoadCursor( NULL, IDC_ARROW ));
566 — ReleaseCapture();
568 — pInst->HasCapture = FALSE;
570 — hDC = GetDC( hWnd );
572 — PaintIntransitObjects( hDC, pInst->CurrPage );
574 — EndIntransitOperation( pInst->CurrPage );
576 — pt = MAKEPOINT( lParam );
578 — PBLightHit( hDC, pInst->CurrPage, pt, FALSE );
580 — MTBLightHit( hDC, pInst->CurrPage, pt, FALSE );
582 — ReleaseDC( hWnd, hDC );
584 — InvalidateRect(hWnd, NULL, TRUE);
586 — break;
```

FIG. 17

```
INT PBLightHit( HDC hdc, PGPAGE pPage, POINT pt, BOOL hilite )
{
    PGOBJECT pselobj;
    INT index;
602——INT hit = 0;

604——if (!pPage) return( 0 );
606——pselobj = pPage->Hitobject;
608——hit = PBHit( pPage, pselobj, pt );

610——for (index = pPage->nPB; index >= 1; index--) {
    612——if (hilite && index == hit)
        614——Highlightobj( hdc, pPage->PBTable[ index ].pPBObj, HILITE_PB );
        616——else
            Unhighlightobj( hdc, pPage->PBTable[ index ].pPBObj, HILITE_PB );
    }
618——return( hit );
}
```

FIG. 18

```
INT PBHit( PGPAGE pPage, PGOBJECT pSelobj, POINT pt )                                    ⤹620
{
     PGOBJECT pLocObj;
     INT index;
622——INT hit = 0;

624——if (!pPage) return( 0 );

626——if (pSelobj->objectType == OT_MTEXTBLOCK || pSelobj->objectType == OT_PLACEBLOCK)
  628——return( 0 );

630——for (index = pPage->nPB; index >= 1; index--){
  632——pLocObj = pPage->PBTable[ index ].pLocObj;
  634——if (pLocObj && pLocObj != pSelobj) continue;
  636——if (PtInRect( &(pPage->PBTable[index].PBRect), pt ))
      638——return( index );
       }
640——return( 0 );
}
```

FIG. 19

```
INT MTBLightHit( HDC hdc, PGPAGE pPage, POINT pt, BOOL hilite )
{
    PGOBJECT pSelobj;
    INT index;
    INT hit = 0;

if (!pPage) return( 0 );
    pSelobj = pPage->Hitobject;
    hit = MTBHit( pPage, pSelobj, pt );

for (index = pPage->nMTB; index >= 1; index--) {
        if (hilite && index == hit)
            Highlightobj( hdc, pPage->MTBTable[ index ].pPBObj, HILITE_PB );
        else
            Unhighlightobj( hdc, pPage->MTBTable[ index ].pPBObj, HILITE_PB );
    }
    return( hit );
}
```

```
INT MTBHit( PGPAGE pPage, PGOBJECT pSelObj, POINT pt )        650
{
      PGOBJECT pLocObj;
      INT index;
      INT hit = 0;

if (!pPage) return( 0 );

652—if (pSelObj->ObjectType != OT_TEXT) return( 0 );

for (index = pPage->nMTB; index >= 1; index--){
          pLocObj = pPage->MTBTable[ index ].pLocObj;
          if (pLocObj && pLocObj != pSelObj) continue;
          if (PtInRect( &(pPage->MTBTable[index].PBRect), pt ))
              return( index );
      }
      return( 0 );
}
```

FIG. 21

```
BOOL GetHitObject( PGPAGE pPage, POINT pt )         ╱ 660
{
        PGOBJECT pObj;

662 — pPage->HitObject = NULL;
664 — pObj = pPage->FirstObject;
666 — while (pObj){
      668 — if (PtInRect( &pObj->ObjectDimensions, pt )){
          670 — pPage->HitObject = pObj;
          }
      672 — pObj = pObj->NextObject;
      }
674 — pObj = pPage->HitObject;
676 — if (!pObj){
      678 — DeselectAllObjects( pPage );
      680 — return( FALSE );
      }
682 — if (!pObj->ObjectSelected){
      684 — DeselectAllObjects( pPage );
      686 — pObj->ObjectSelected = TRUE;
      }
688 — pPage->IntransitObject = CopyObject( pPage, pObj, TRUE );
690 — pInst->OrigPt = pt;
692 — pInst->PrevPt = pt;
694 — return( TRUE );
}
```

FIG. 22

```
void DeselectAllObjects( PGPAGE pPage )          /─700
{
     PGOBJECT pObj;

pObj = pPage->FirstObject;
     while (pObj){
          pObj->ObjectSelected = FALSE;
          pObj = pObj->NextObject;
     }
}
```

FIG. 23

```
                                                    ┌720
    void EndIntransitOperation( PGPAGE pPage )
    {
         PGOBJECT pObj, pIntransObj;
         POINT shift;

722 ──shift.x = pInst->PrevPt.x - pInst->OrigPt.x;
724 ──shift.y = pInst->PrevPt.y - pInst->OrigPt.y;
726 ──pIntransObj = pPage->IntransitObject;
728 ──pObj = GetSelectedObject( pPage, NULL );

730 ──MoveSizeObject( pPage, pObj, shift );
732 ──PBObjectMoved( pPage, pObj, pInst->PrevPt );
734 ──PBObjectEdited( pInst, pPage, pObj );

736 ──DelObject( &pPage->IntransitObject, pPage->IntransitObject );

```
void PBObjectMoved( PGPAGE pPage, PGOBJECT pobj, POINT pt )
{
    INT hit;

752 ── hit = PBHit( pPage, pobj, pt );
754 ── if (hit){
756 ──   if (hit != pobj->PB_id)
758 ──     PBLink( pPage, pobj, hit );
760 ──   return;
    }
762 ── hit = MTBHit( pPage, pobj, pt );
764 ── if (hit){
766 ──   if (hit != pobj->MTB_id)
768 ──     MTBLink( pPage, pobj, hit );
770 ──   return;
    }
772 ── if (IsPBLinkedActive( pobj ) || IsMTBLinkedActive( pobj ))
774 ──   UnlinkObj( pPage, pobj, FALSE );
}
```

FIG. 25  ⤷ 750

```
void PBObjectEdited( PINST pInst, PGPAGE pMaster, PGOBJECT pobj )
{
    PGPAGE pPage;

782 ── if (pobj->objectType != OT_PLACEBLOCK
            && pobj->objectType != OT_MTEXTBLOCK) return;

784 ── pPage = pInst->PresPages;
786 ── while (pPage){
788 ──   if (UsesThisMaster( pPage, pMaster ))
790 ──     pPage->OutOfDate = TRUE;
792 ──   pPage = pPage->NextPage;
    }
}
```

FIG. 26  ⤷ 780

```
void PaintPage( HDC hdc, PGPAGE pPage, BOOL isMaster ) ⬈800
{
    PGOBJECT pobj;

802─── if (!pPage) return;
804─── PaintPage( hdc, pPage->MasterPage, TRUE );
806─── if (pPage->OutOfDate)
808───     BuildTables( pPage );
810─── pObj = pPage->FirstObject;
812─── while (pobj){
814───     PaintObject( hdc, pobj, isMaster );
           pObj = pobj->NextObject;
       }
818─── if (isMaster) return;
820─── PaintEmptyMasterObjects( hdc, pPage );
822─── pObj = pPage->FirstObject;
824─── while (pobj){
826───     PaintObjectHilight( hdc, pobj );
           pObj = pobj->NextObject;
       }
828─── PaintIntransitObjects( hdc, pPage );    FIG. 27
} void PaintEmptyMasterObjects( HDC hdc, PGPAGE pPage )  ⬈850
{
    INT i;
852─── for (i=1; i<=pPage->nPB; i++){
854───     if (!pPage->PBTable[ i ].pLocObj)
856───         PaintObject( hdc, pPage->PBTable[ i ].pPBObj, FALSE );
       }
858─── for (i=1; i<=pPage->nMTB; i++){
860───     if (!pPage->MTBTable[ i ].pLocObj)
862───         PaintObject( hdc, pPage->MTBTable[ i ].pPBObj, FALSE );
       }
}
```

FIG. 28

PRESENTATION MANAGER

This is a continuation of application Ser. No. 07/691,479, filed Apr. 25, 1991, now abandoned.

BACKGROUND OF THE INVENTION

The invention relates to a graphics presentation application.

In general, graphics presentation applications are software packages that enable a user to create, modify and manage "presentations" on a computer. A typical "presentation" usually includes of a collection of pages, each page corresponding to one page of printed final output. If the final output is a screen show or slide show, then one page corresponds to one screen or one slide, respectively. Each page typically contains a number of graphical objects, which are single graphical entities on a page that may be created by the graphics presentation application. Examples of graphical objects include polygons, rectangles, ellipses, lines, curves, and text blocks. There may also be composite graphical objects called symbols and charts which behave like single objects but are in fact made up of multiple objects.

After a graphical object has been created on a page, a user can "select" the graphical object by, for example, clicking on it with a mouse that is attached to the computer on which the graphics presentation application is running. Once selected, the object can manipulated in a variety of ways. For example it can be moved by dragging it across the display screen with the mouse. It can also be stretched, copied, or deleted. Its attributes such as interior color, edge color, and edge thickness can also be changed.

In short, the graphics presentation application gives the user the ability to quickly and efficiently do on a computer what was previously done through laborious and time consuming cutting and pasting at a drawing board.

SUMMARY OF THE INVENTION

In general, in one aspect, the invention features a presentation manager including means for representing a graphical object on a page, the graphical object having a size and a placement on that page; means for representing a container object that is associated with the page, the container object having a set of specified characteristics; means for dragging the graphical object to another location on the page; and means for linking the graphical object to the container object when it is dragged into the container object. The linking means creates an active link to the container object when the graphical object is dragged into it and the active link imposes the set of specified characteristics on the graphical object.

Preferred embodiments include the following features. The presentation manager includes means for unlinking the graphical object from the container object when the graphical object is dragged out of the container object, wherein the unlinked graphical object is then free to take on characteristics that are independent of the set of specified characteristics. The container object is either a placement block or a text block. If the container object is a placement block, the set of specified characteristics includes size and placement and the linking means imposes only the size and placement characteristics of the placement block on the graphical object when the graphical object is dragged into it. If the container object is a text block, the set of specified characteristics includes size, placement and preselected attributes and the linking means imposes the set of specified characteristics on the graphical object when the graphical object is dragged into it. The preselected attributes include one or more features selected from a group including typeface, font size, color of text, color of background, bullet style, appearance, indents, spacing, justification, and word wrap and also including border color, border width and border style.

Also in preferred embodiments, the presentation manager includes means for highlighting the container object when the graphical object has entered the container object. The dragging means includes means for capturing the graphical object; means for representing the captured graphical object by an in-transit object; means for moving the in-transit object to another location on the page; and means for releasing the in-transit object at the conclusion of a move. The moving means includes means for determining whether the in-transit object has entered the container object; and means for highlighting the container object when it has been determined that the in-transit object has entered the container object. The presentation manager also includes means for unhighlighting a highlighted container object when the releasing means releases the in-transit object into the highlighted container. The linking means includes means for detecting when the releasing means has released the in-transit object; means for determining whether the in-transit object has entered the container object; means for repositioning the captured graphical object into the container object in response to the releasing means releasing the in-transit object and if the determining means determines that the in-transit object has entered the container object, wherein the repositioning means imposes the set of specified characteristics on the graphical object. The linking means includes means for erasing the in-transit object in response to the releasing means releasing the in-transit object.

Preferred embodiments further include the following additional features. The container object is on a different page from the graphical object and the presentation manager further includes means for assigning that different page to the first mentioned page so that the container object is associated with the first mentioned page. The presentation manager also includes means for disassociating the different page from the first mentioned page so that the different page is no longer assigned to the first mentioned page and the container object is no longer associated with the first mentioned page. The disassociating means further includes means for making dormant any link that the graphical object may have with the container when the disassociating means disassociates the different page from the first mentioned page. The presentation manager also includes means for displaying the page. The display means renders the graphical object visible and it renders the container object visible only when the container object is associated with the page and when the graphical object has no active link to the container object. The display means also includes means for rendering the container object invisible when the graphical object is dragged into the container object.

In general, in another aspect, the invention features a method of managing a presentation including the steps of representing a graphical object on a page, the graphical object having a size and a placement on that page;

representing a container object that is associated with the page, the container object having a set of specified characteristics; and linking the graphical object to the container object when the graphical object is dragged into it, wherein the linking step imposes the set of specified characteristics on the graphical object when the graphical object is dragged into the container object.

Also in preferred embodiments, the method includes the step of unlinking the graphical object from the container object when the graphical object is dragged out of the container object, wherein the unlinked graphical object is then free to take on characteristics that are independent of the set of specified characteristics.

The invention greatly improves the versatility of graphics presentation applications and offers the user increased flexibility in designing, laying out, and modifying presentations.

Other advantages and features will become apparent from the following description of the preferred embodiment and from the claims.

DESCRIPTION OF THE PREFERRED EMBODIMENT

FIG. 4 is a C language description of the AddObject function;

FIG. 5 is a C language description of the DeleteSelectedObject function;

FIG. 6 is a C language description of the SetTextAttrib function;

FIG. 7 is a C language description of the AssignMaster function;

FIGS. 8a–b present a C language description of the BuildTables function; FIG. 9 is a C language description of the FreeTables function;

FIG. 10 is a C language description of the PBLink function;

FIG. 11 is a C language description of the PBResizeObject function;

FIG. 12 is a C language description of the MTBLink function;

FIG. 13 is a C language description of the MTBCopyInfoToObject function;

FIG. 14 is a C language description of the UnlinkObj function;

FIG. 15 is a C language description of the ButtonDown function;

FIG. 16 is a C language description of the MouseMove function;

FIG. 17 is a C language description of the ButtonUp function;

FIG. 18 is a C language description of the PBLightHit function;

FIG. 19 is a C language description of the PBHit function;

FIG. 20 is a C language description of the MTBLightHit function;

FIG. 21 is a C language description of the MTBHit function;

FIG. 22 is a C language description of the GetHitObject function;

FIG. 23 is a C language description of the DeselectAllObjects function;

FIG. 24 is a C language description of the EndIntransit function;

FIG. 25 is a C language description of the PBObjectMoved function;

FIG. 26 is a C language description of the PBObjectEdited function.

FIG. 27 is a C language description of the PaintPage function;

FIG. 28 is a C language description of the PaintEmptyMasterObjects function.

Figure 29:
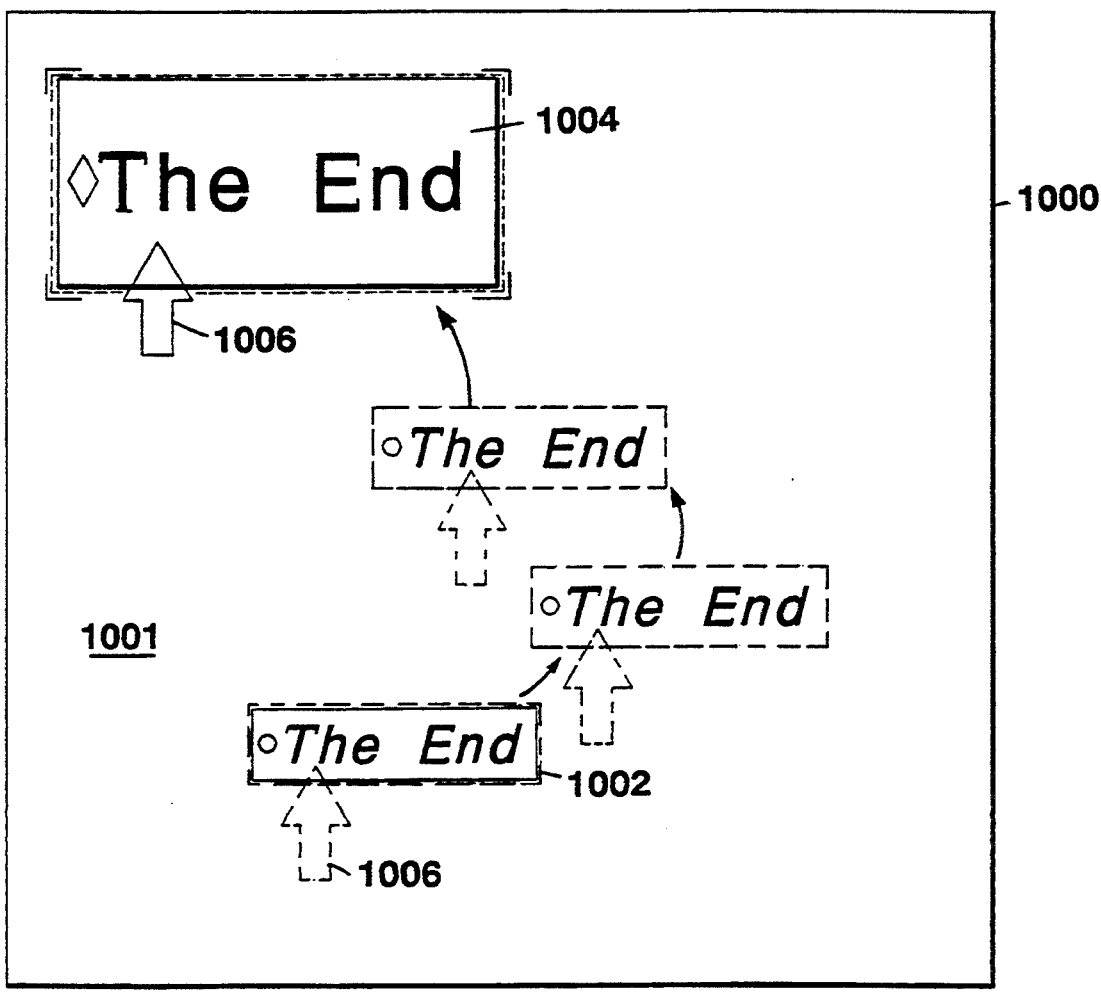

FIG. 29 illustrates the operation of the invention with the images appearing on a display screen.

Also attached hereto after the claims is Appendix I, consisting of 19 pages of a C language program listing for an embodiment of the invention.

STRUCTURE AND OPERATION

Figure 1:
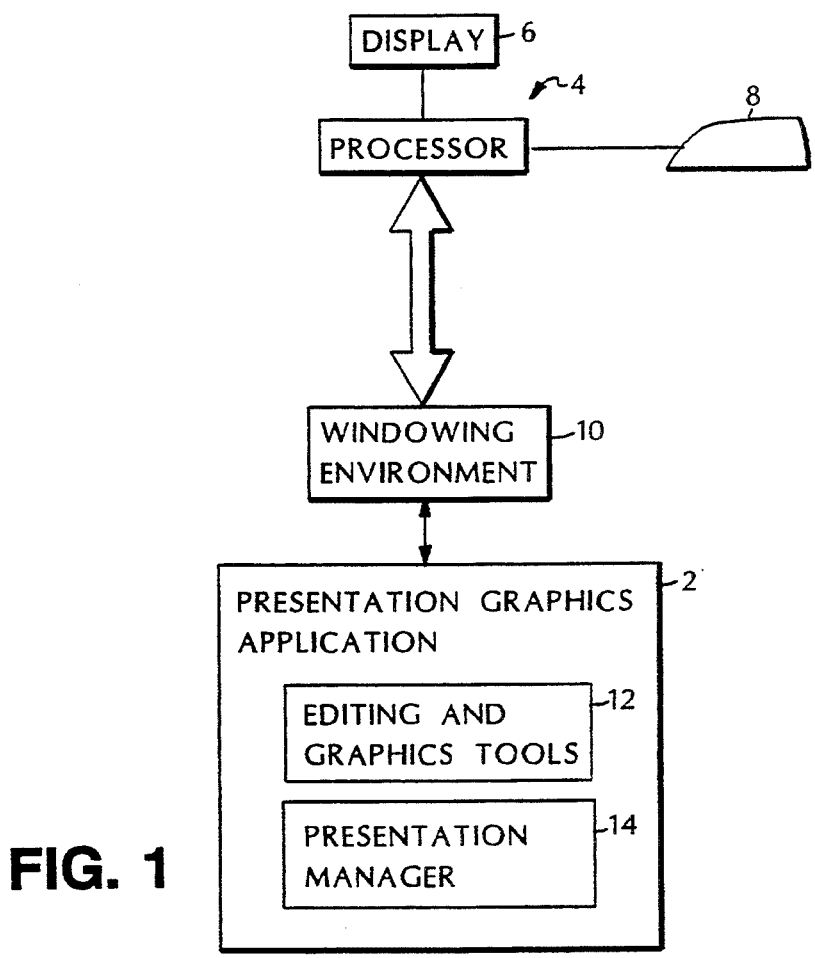
FIG. 1 is a block diagram of the hardware and software components of a system which runs a graphics presentation application.

Referring to FIG. 1, a graphics presentation application 2 runs on a personal computer 4 such as an IBM PC using an 80386 microprocessor. Computer 4 includes at least a display screen 6 for displaying output to a user and a mouse 8 for enabling a user to interact with the computer and to control its operation. Graphics presentation application 2, which enables the user to easily create, modify and edit a "presentation", such as a slide presentation that might accompanying a talk, runs under a window-oriented operating system/environment 10 which includes a mouse driver for processing the input from mouse 8. Windowing environment 10 takes care of displaying information on display screen 6 and it provides any command menus that are requested by graphics presentation application 2. Graphics presentation application 2 includes a set of graphics and editing tools 12 such as may be found within commercially available products which enable a user to create and modify graphical objects. Graphics presentation application 2 also includes a presentation manager 14 which provides the environment in which the graphical objects are created and which includes presentation pages and Master Pages (defined below).

Before exploring the details of the underlying data structures and algorithms within presentation manager 14, a brief overview of its operation and capabilities will be presented beginning with an explanation of what a presentation is.

In addition to the normal pages in a presentation ("presentation pages"), there are one or more "Master Pages", which are kept separate from the presentation pages. Master Pages are used as backgrounds for the presentation pages. Each page may have at most one master page assigned as its current background.

Presentation graphics application 2 creates two types of objects, namely, template block (TB's) and graphical objects. Each TB can have multiple instances of itself, one for each presentation page that uses a Master Page. Each instance of a TB can have at most one graphical object associated with it. Each graphical object can be associated with at most one TB of a particular class. Each class of TB provides a standard set of information to the graphical object, for example it can specify what color the graphical object should appear. Each instance of a TB receives the same information. If the information in a TB changes, then all graphical objects associated with instances of it also change. An instance of a TB is visible when it is empty (i.e., not associated with a graphical object). A graphical object may be associated with a TB by dragging the object "into" the TB with a mouse.

In the described embodiment, there are two classes of TB: Placement Blocks (PBs) and Master Text Blocks (MTBs). PBs provide size and placement information to their associated graphical objects and can associate with any graphical object. MTBs provide text style information in addition to size and placement. The text style information may include such items as choice of font, size of font, color of text, color of background, choice of text bullet, and indent amount for each of three outline levels. MTBs can only associate with text blocks, which are a specific kind of graphical object.

TB's come in sets (TB sets). One TB set can be substituted for another TB set. When this happens, the graphical objects associated with TBs in the old set become associated with corresponding TB's in the new set.

A key feature of this reassociation is that the new set may not have corresponding TBs for all the TBs of the original set. In this case, the graphical objects are left dissociated, but they remember which TBs they were previously associated with. This is called "dormant association." At a later time, if a third set of TBs is substituted, then graphical objects become associated with corresponding TBs in the third set, including TBs that had been dormant-associated, As an example, imagine two sets of TBs, one with several TBs and one with none at all. Start with a collection of graphical objects associated with the first set. Now substitute the second (empty) set. All the graphical objects become dissociated. Now substitute back the original set. All the graphical objects will reassociate with the TB's they had originally associated with.

Any method may be used to determine the correspondence of TBs between TB sets. A simple method is order of occurrence within the set. Using this method, the first TBs of a given class from each set would correspond with one another, as would the second, the third, etc. Another possible correspondence would be to give each TB in a set a unique text name. A TB from one set would correspond with a TB from another set only if the names of the two TBs matched.

Certain operations on graphical objects may cause them to lose their dormant association. For example, the user may wish to associate a dormant-associated graphical object with a different TB of the same class. Since a graphical object can only be associated with one TB of a particular class at a time, the dormant-association is dropped when the new association is created.

Master Pages can contain all the same sorts of graphical objects as are contained in presentation pages. In addition, Master Pages can contain TBs, which presentation pages can not. A Master Page defines a "TB set." When a presentation page has a Master Page assigned to it, all the graphical objects on the Master Page are visible as if they were on the page itself; however, they can not be selected or manipulated in any way. In addition, the presentation page receives exactly one instance of each TB on the Master Page. A Master Page can be assigned to many presentation pages at the same time; however, only one Master Page can be assigned to a presentation page at a time. To replace the current TB set of a presentation page with a new TB set, the user assigns a new Master Page to the presentation page.

A user can associate a graphical object on a presentation page with a TB instance from the page's Master Page by dragging the object into the TB with mouse 8 and then releasing it.

The data structures and the algorithms which implement these features will now be described.

The Data Structures:

Referring to FIG. 1, within presentation manager 14 two types of pages, namely, presentation pages and Master Pages, are represented by a presentation page data structure 100 and a Master Page data structure 200, respectively. Though data structures 100 and 200 are identical, as will become apparent, some of the fields of Master Page data structure 200 are not utilized in the described embodiment.

Figure 3:
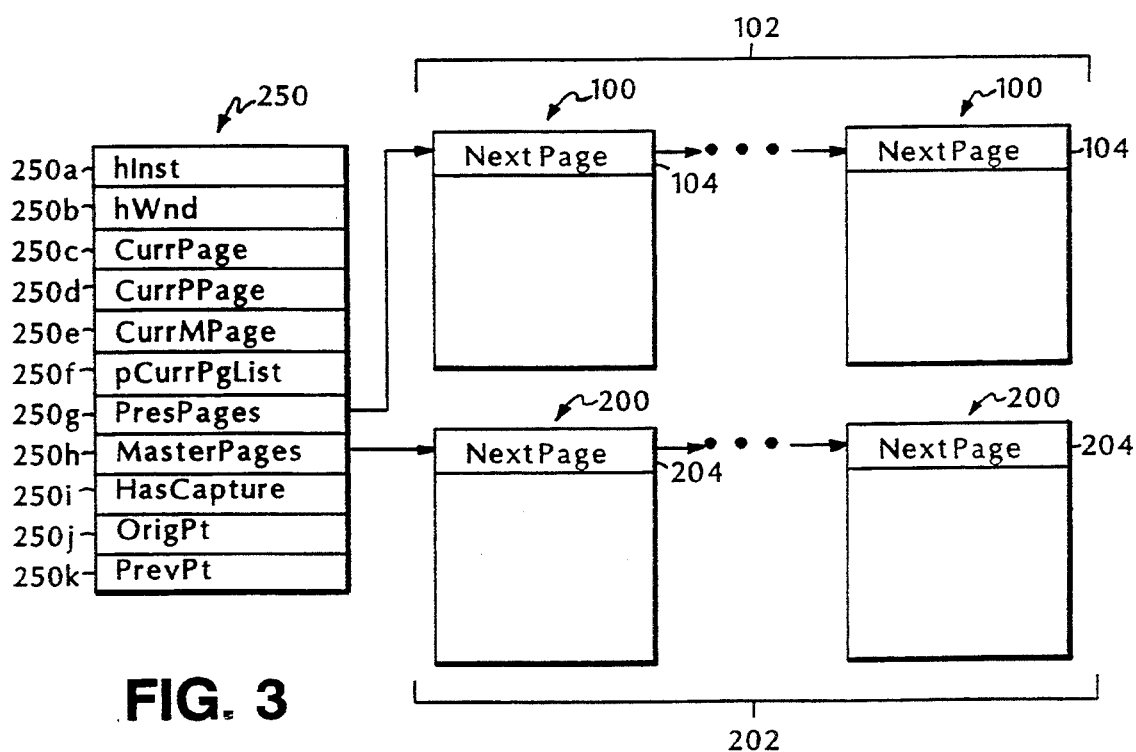
FIG. 3 shows the instance data structure.
Figure 2:
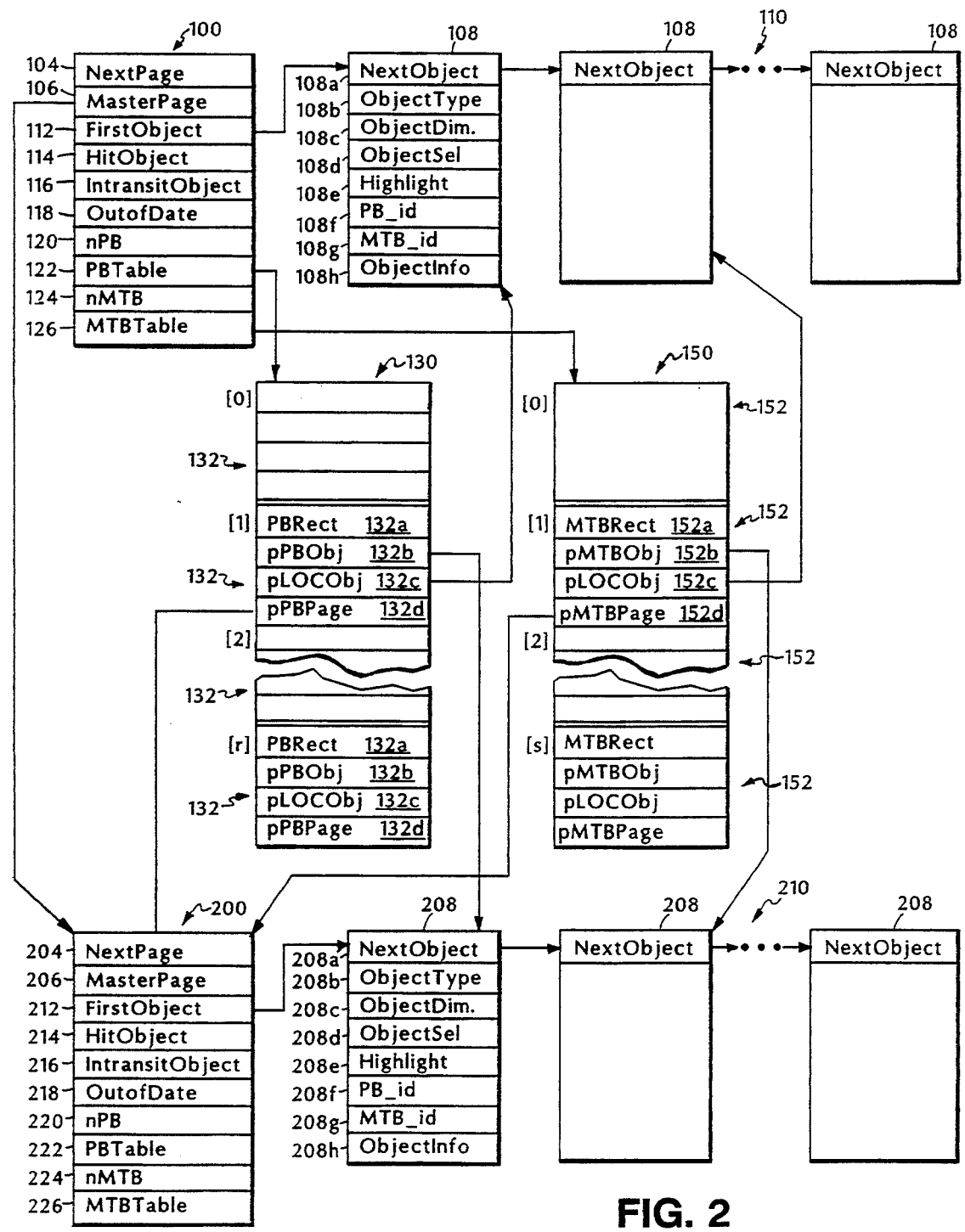
FIG. 2 shows the data structures for a presentation page and a Master page that is assigned to that presentation page.

Typically, a presentation page will be one of many which form a complete presentation. As shown in FIGS. 2 and 3, the presentation page data structures 100 of the complete presentation are linked together to form a linked list 102. Each page data structure 100 within linked list 102 contains a NextPage pointer 104 which identifies the next member of linked list 102.

A Master Page from a set of Master Pages may be assigned to each of the pages of a presentation. The Master Page supplies the background information for the presentation page. That is, it contains the master text blocks, the presentation blocks and graphical objects which will appear on the presentation page to which it is assigned. Each page data structure 100 contains a MasterPage pointer 106 which points to the particular Master Page data structure which has been assigned to that page. If a Master Page has not been assigned or if it has been deassigned, MasterPage pointer 106 is a null pointer.

Each presentation page can have one or more graphical objects associated with it. The objects are each represented by an object data structure 108 and the collection of object data structures 108 for a given presentation page forms a linked list 110. A FirstObject pointer 112 in page data structure 100 identifies the first member of the linked list of objects that is associated with the presentation page. When an new object is created for that page, it is added to the end of linked list 110. Thus, the order of objects within that list is determined by the order in which they were created.

Each page data structure 100 also contains information that is used when manipulating (e.g. dragging) some object which is located on the presentation page. For example, to move an object on a particular presentation page, the user positions the mouse cursor on the object, clicks on the object and then drags the object to the desired location. A HitObject pointer 114 points to the particular member of linked list 110 which the user clicked on and an IntransitObject pointer 116 points to a copy of that object.

Whenever the user moves an object or alters anything on a Master Page, the page data structure 100 for each page to which that Master Page was assigned is marked as being out of date. An out of date presentation page must be recomputed before it can be redisplayed. An OutofDate flag 118 serves to mark page data structure 100 as containing stale information.

For a given presentation page, all of the PB's in that page's current Master Page are identified in a PBTable data structure (PBTable) 130 and all of the MTB's in that page's current Master Page are identified in an MTBTable data structure (MTBTable) 150. Two pointers in page data structure 100, namely, a PBTable pointer 122 and an MTBTable pointer 126, point to these data structures. Two other fields, namely, an nPB field 120 and an nMTB field 124, specify the number of elements in PBTable 130 and MTBTable 150, respectively.

A Master Page, like its counterpart the presentation page, is generally part of a set. Thus, referring to FIG. 3, each Master Page data structure 200 contains a NextPage pointer 204 that identifies the next member of a linked list 202 of Master Pages which make up that set. In the described embodiment, a Master Page, unlike a presentation page, does not have another Master Page associated with it. Thus, Master Page pointer field 206 of Master Page data structure 200 is unused. Because Master Pages are not assigned Master Pages, the last four fields of MasterPage data structure 200, namely fields 220 through 226, corresponding to the four fields in page data structure 100 containing Table information, are also not used.

Like presentation pages, a Master Page can also have one or more objects associated with it. The objects are represented by object data structures 208 that form a linked list 210. Master Page data structure 200 contains a FirstObject pointer 212 which identifies the first member of linked list 210.

The objects on a Master Page may be manipulated just like the objects on a presentation page may be. Thus, there is also a HitObject pointer 214 and an IntransitObject pointer 216 within Master Page data structure 200 which serve the same function as their counterparts within page data structure 100.

As noted earlier, the user can create objects on Master Pages just as the user can create objects on a presentation page. For each such object created on the Master Page, there is an object data structure 208. The collection of object data structures associated with a Master Page form a linked list 210.

Each object data structure, whether it be an object data structure for a presentation page or for a Master Page, includes an ObjectType field 108a (208a) for specifying what type of object it is. For Master Pages, in addition to the object types which may be specified for presentation pages, the are also the two special types, namely, OT_PLACEBLOCK for placement blocks and OT_MTEXTBLOCK for master text blocks.

As noted earlier, each object is typically a part of a linked list of objects associated with the page. Thus, each object data structure 108 (208) contains a NextObject pointer 108b (208b) identifying the next object data structure in the linked list of which it is a part.

In the described embodiment, the location of an object is defined by a rectangle that bounds the object. The information specifying the size and location of this rectangle is identified in an ObjectDim field 108c (208c) and includes the x and y coordinates of the left, right, top and bottom edges of the rectangle containing the object.

Each object data structure 108 (208) contains an ObjectSel field 108d (208d) for indicating whether the object has been selected by the user so that it may dragged somewhere or modified in some manner. When an object is selected, the system highlights the object on the screen by, for example, displaying small rectangular "highlight handles" in the corners of the objects bounding box. There is a Highlight field 108e (208e) which can be used for indicating what type of highlighting is to be displayed for selected objects.

An object on a presentation page can be either unassociated (i.e., free floating) or it can be associated with a Template Block (i.e., PB or MTB). If it is associated, its object data structure contains an index into the appropriate table (i.e., either PBTable 130 or MTBTable 150) identifying the entry which corresponds to the specific TB with which it is associated. There are two index fields, namely, PB_id 108f and MTB_id 108g, for specifying two indexes, one for PBTable 130 and the other for MTBTable 150. A value of 2, for example, appearing in one of these index fields indicates that the object is associated with the 2nd entry in the associated table. A value of 0, on the other hand, indicates that the object is not associated with any TB. Since an object is permitted to only have one association at a time, if one of these indexes (e.g. nPB) is non-zero the other one (i.e., nMTB) must be zero.

A particular bit in PB_id 108f and in MTB_id 108g, referred to as the DORMANT_FLAG, is reserved to indicate that the object is dormant-associated. For example, a value of DORMANT_FLAG+2 for PB_id 108f indicates that the object is dormant associated with the 2nd PB on the master page. (As will become apparent later, it also indicates that the current master page has less than 2 PBs in it.)

Note that since Master Pages are not assigned to other Master Pages in the present embodiment, the two fields corresponding to PB_id field 108f and MTB_id field 108g (i.e., PB_id field 208f and MTB_field 208g) are unused.

The last field of each object data structure 108 (208), namely, ObjectInfo field 108h and ObjectInfo field 208h, contains object-specific information. For example, it contains the contents of the object such as text, a graph or a figure, and it contains style and formatting information.

For a given presentation page, PBTable 130 and MTBTable 150 duplicate information found within object linked list 210 off of Master Page data structure 200. The tables provide, however, more condensed and more easily accessible presentations of that information. Instead of having to search down through linked list 210 to find all PB'S and the pertinent information about them, a simple search of PBTable 130 can be conducted.

PBTable 130 is implemented as an array having a specified number of entries 132. An entry 132 is identified by its location within the array. The first entry (i.e., location zero) is unused. Each of the remaining entries 132 contains a PBRect field 132a specifying the dimensions and location of the PB to which it corresponds. This information is used to determine when the mouse cursor has moved inside a TB. Each entry 132 also contains two pointers, namely pPBObj 132b and pLOCObj 132c. pPBObj 132b points to the original PB on the Master Page and pLOCObj 132c points to the graphical object on the presentation page which is currently associated with that PB. If pLOCObj 132c is null, the PB is empty or unassociated. Finally, each entry contains a pPBPage pointer 132d pointing back to Master Page data structure 200 for the Master Page on which the PB appears.

MTBTable 150, like PBTable 130, is also implemented as an array having a fixed number of entries 152. The first entry is unused. Each of the remaining entries 152 contains a MTBRect field 152a specifying the dimensions and location of the MTB to which it corresponds. It also contains two pointers, namely pMTBObj 152b and pLOCObj 152c, which point to the objects to which the entry corresponds within linked lists 110 and 210, respectively. Finally, each entry contains a pMTBPage pointer 152d pointing back to the Master Page data structure 200 for the Master Page on which the PB appears.

The combination of the complete presentation (i.e., the set of presentation pages) and the associated set of Master Pages that has been assigned to it is referred to as an application instance. Each instance has a corresponding data structure (INST) 250 such as is shown in FIG. 3. INST data structure 250 is used to coordinates accesses to the pages and objects within the instance. Each INST data structure 250 contains an hInst field 250a and an hWnd field 250b for information that is passed to it from the Windows environment. This information must be passed back to the Windows environment when windows is called upon to draw anything on the screen or print anything on the printer.

INST data structure 250 also contains a CurrPage pointer 250c, a CurrPPage pointer 250d and a CurrMPage pointer 250e. CurrPPage pointer 250d points to the particular page within linked list 102 that the user had last selected to work on. CurrMPage pointer 250e points to the particular Master Page within linked list 202 that the user had last selected to work on. CurrPage pointer 250c points to the particular one of the two pages identified by CurrPPage pointer 250d and CurrMPage pointer 250e that the user is currently working on. That is, CurrPPage pointer 250d and CurrMPage pointer 250e remember where the user was last and CurrPage pointer 250c keeps track of where the user is now. CurrPage pointer 250c is always equal to one of the other two pointers.

In a similar manner, INST data structure 250 keeps track of which linked list (i.e., presentation pages or Master Pages) the user is working on. There are three pointers for this purpose, namely, a pCurrPgList pointer 250f, a PresPages pointer 250g and a MasterPages pointer 250h. PresPages pointer 250g identifies the first member of the linked list of presentation pages. MasterPages pointer 250h identifies the first member of the linked list of Master Pages. And pCurrPgList pointer 250f points to one of two linked lists, in particular, the one which the user is currently working on.

INST data structure 250 also includes a HasCapture flag 250i to indicate when the user is in the middle of a move operation, i.e., when the user is dragging or manipulating an object within either a presentation page or a Master Page of the Master Set.

Finally, INST data structure 250 includes a OrigPt field 250j and a PrevPt field 250k for information that is useful to processing a mouse move. OrigPt field 250j is for the location of the mouse when the user first pushed the mouse button down (i.e., clicked on the object) at the beginning of a mouse move. And PrevPt field 250k is used for processing the mouse move after an object has been clicked on. It contains the location of the mouse when the mouse move was last processed by the system. During a mouse move, the difference between the current location of the mouse and the contents of PrevPt field 250k indicates how far the mouse has moved since the screen was last updated.

The Algorithms:

Adding, Deleting and Editing Objects

The application's command menu offers the user the option to add objects of selected types to the current page. When the Add Object feature is chosen, the windows process invokes an AddObject function 252 in the presentation manager which carries out the operations shown in FIG. 4. The call to AddObject 252 passes a pointer to the data structure for the current page and an object type determined by the users selection (e.g. rectangle, text block, PB or MTB).

Next, AddObject 252 calls a myAlloc utility to create a new data structure and return a pointer (pNewObj) to that structure (step 254). Then, AddObject 252 checks whether pNewObj is a null pointer, i.e., it performs a sanity check to make sure no problems have occurred in creating the new data structure (step 255). If pNewObj is a null pointer, AddObject 252 returns control to the calling function and reports an error. If pNewObj is not a null pointer, AddObject 252 fills in certain fields of the new data structure, specifying the object type (step 256), default values for the object dimensions (step 257) and setting ObjectSel Flag 108d to True (step 258).

After the appropriate information has been stored in the new object data structure, AddObject 252 calls a DeselectAllObjects function 700 (see FIG. 23) to deselect all objects that might currently be marked as selected (step 259). This involves setting the ObjectSel flag 108d in each object 108 in linked list 110 to False.

After all ObjectSel flags have been cleared, AddObject 252 determines whether there is a first object associated with the page by checking FirstObject pointer 112 (step 260). If FirstObject pointer 112 is not a null pointer, AddObject 252 finds the last object in linked list 110 and sets NextObject pointer 108a in that object to point to the new data structure (i.e., NextObject=-pNewObject) (steps 261-263). On the other hand, if FirstObject pointer 112 is a null pointer, AddObject 252 sets it to point to the new data structure (step 264).

Once the new object data structure has been initialized and added to linked list 110, AddObject 252 calls a PBObjectEdited function 780 (see FIG. 26) which checks whether the object which was added was either a PB or an MTB (step 265). If the user had been working on a Master Page and object happened to be a PB or an MTB, then any pages that use this page as a Master Page must be updated. PBObjectEdited 780 makes sure that the updating of those pages occurs.

As its final step, AddObject 252 makes a windows call to an InvalidateRect function which repaints the screen to display the new object (step 266).

The application offers the user the ability to delete a selected object. When this option is invoked, the windowing environment invokes a DeleteSelectedObject function 270, which operates as shown in FIG. 5. DeleteSelectedObject 270 first gets a pointer to the selected object by calling a GetSelectObject utility which searches down the linked list of objects for the relevant page to find the object which the user has selected (i.e., the object which has a ObjectSel flag set to True) (step 272). Then, function 270 calls PBobjectEdited function 780 (see FIG. 26) to check whether the object being deleted was either a PB or an MTB and if so to mark all pages which use the Master Page containing that object (step 273). Next, function 270 calls an UnlinkObj function 480 (see FIG. 14) to eliminate any links for that object (step 274). Finally, function 270 calls a DelObject utility to delete the object and free up the memory which it had been using (step 275).

Another option on the menu enables the user to set the attributes of a selected text object. A list of attributes are presented to the user including, among others, various selections of font size and type face. The user selects an attribute by clicking the mouse on the desired selection. The option selected generates a corresponding message. The windowing environment responds to that message by invoking a SetTextAttrib function 280 in the presentation manager. The details of the operation of that function are as follows. Referring to FIG. 6, when invoked, SetTextAttrib 280 initializes several internal variables. It sets a "size" variable and a "face" variable to zero (representing the default settings for font and typeface, respectively) and it sets a bSize flag to False (step 281). Then, SetTextAttrib 280, through a switch instruction, sets its internal variables (i.e., the "size" and the "face" variables) to appropriate values depending upon what attribute the user selected (step 282). After setting its internal variables, SetTextAttrib 280 checks if the size variable is non-zero (step 283). If the size variable is non-zero, the bSize flag is set to True. Then, SetTextAttrib 280 checks if the size variable is equal to one, and if it is, sets it back to zero (step 284). As will become apparent, this limits the type faces that are available for that particular font to the default type face.

Next, SetTextAttrib 280 calls the GetSelectedObject utility to retrieve a pointer to the object data structure for the object which the user has selected (step 285). SetTextAttrib 280 checks whether the bSize flag is True, and if it is, sets the font size attribute for the selected object, as specified in the Objectinfo[0] field, equal to the value of the "size" variable (step 286). If the bSize flag is False, SetTextAttrib 280 leaves the font size specified for the object undisturbed and revises the type face (i.e., Objectinfo[1]) to equal the value of the "face" variable (step 287). Before ending, SetTextAttrib 280 calls PBObjectEdited 780 to determined whether the object which was selected was either a PB or an MTB, and if so, to mark the pages which use the Master Page on which the object is present as requiring updating (step 288).

Assigning a Master Page

After the user has generated a presentation page and a set of Master Pages, he may assign a selected one of the Master Pages to the presentation page. In general, to implement this assignment, the presentation manager calls an AssignMaster function which carries out the following tasks. First, the presentation manager sets MasterPage pointer 106 in page data structure 100 to point to Master Page data structure 200 for the selected Master Page. Then, before the next display of the presentation page, the presentation manager updates (i.e., builds or rebuilds) PBTables 130 and MTBTables 150 to support that assignment.

The details of how the assignment function (i.e., AssignMaster 300) operates are presented in FIG. 7. AssignMaster 300 uses two internal variables: a page data structure pMPage and an index i. The call to AssignMaster 300 passes a pointer (pPage) to the presentation page to which the master is being assigned and an index n which identifies the Master Page within linked list 202 which is being assigned to that presentation page. The index n can take on any integer value including zero. The case of n equal to zero is a special case. In that case, AssignMaster 300 deassigns the Master Page, i.e., it breaks the link from the presentation page to the previously assigned Master Page.

When AssignMaster 300 is called, it checks the value of n (step 302). If n is less than or equal to zero, AssignMaster 300 sets MasterPage pointer 106 in page data structure 100 equal to null (step 304), thereby deassigning any Master Page which might have been assigned to that presentation page. Next, it sets OutofDate flag 118 equal to True to force a recalculation of the data structures associated with that presentation page (step 306). Finally, it calls a BuildTables function 330 (see FIGS. 8a–b) to deallocate any PBTable data structure which might currently exist for that presentation page (step 308). After BuildTables 330 finishes, AssignMaster 300 returns control to the function which called it (step 310).

In step 302, if n is not less than or equal to zero, AssignMaster 300 sets its internal variable pMPage equal to MasterPages pointer 250h from INST data structure 250 (step 312). Variable pMPage now points to the linked list of Master Pages from which the assigned Master Page will be selected. Then, AssignMaster 300 moves down linked list 202 one Master Page at a time until it reaches the nth Master Page (step 314). It uses the internal variable i to count the pages as it moves down linked list 202. At the beginning of this search, AssignMaster 300 sets i to one and checks whether it is less than n. If i is less than n, AssignMaster 300 sets pMPage equal to the value of NextPage pointer 204 found within the first Master Page of linked list 202. At that point, pMPage identifies the second Master Page in linked list 202. To make sure that it has not gone past the end of the linked list, AssignMaster 300 checks pMPage. If pMPage is a non-null pointer, AssignMaster 300 increments i and moves onto the next Master Page. At some point either pMPage will become a null pointer or i will reach n. If pMPage becomes a null pointer before i reaches n, AssignMaster 300 returns to the calling function and generates an error signal indicating that there are less than n Master Pages in the set. If i reaches n without a null pointer appearing, the final value of pMPage points to the nth Master Page in linked list 202.

Then, AssignMaster 300 sets MasterPage pointer 106 in the appropriate page data structure 100 equal to pMPage (step 316) and it sets OutofDate flag 118 to True (step 318). By this point in its operation, AssignMaster 300 has linked the Master Page to the presentation page (i.e., MasterPage pointer 106 points to the appropriate Master Page data structure) and is now ready to create the appropriate PBTable and MTBTable data structures. Thus, in the next step, AssignMaster 300 calls BuildTables 330 to generate those data structures (step 320).

The BuildTables Function

The operation of BuildTables 330 is shown in FIGS. 8a–b. In general, BuildTables 330 frees any existing PBTables and MTBTables and then builds new ones based on the current Master Page. The calling function is responsible for passing a pointer to the page that should be used to build new tables. Upon being called, BuildTables 330 initializes two internal variables, nPB and nMTB, to zero and sets an internal pointer (pmaster) equal to MasterPage pointer 106 in the appropriate page data structure 100 (steps 332–338). Then, BuildTables 330 calls a FreeTables function 400 (see FIG. 9) to free any tables that might currently exist for the presentation page (step 340). The operation of FreeTables 400 is described elsewhere. Suffice it to say that FreeTables 400 dumps the existing PBTables 130 and MTBTables 140 for that presentation page and makes all existing links to TBs dormant-associated.

After BuildTables 330 has cleared out any old PBTables 130 and MTBTables 150, it sets OutofDate flag 118 in page data structure 100 to False (step 342). Before proceeding, BuildTables 330 checks whether a Master Page has been identified for assignment (step 344). If no Master Page has been passed to the function, it ceases execution and returns control to the calling function.

If pmaster points to a valid Master Page, BuildTables 330 sets the value of an internal pointer (pObj) equal to the value of FirstObject pointer found in the Master Page data structure (step 346). Thus, pObj now points to the first object in the linked list of objects that is associated with the Master Page. Next, BuildTables 330 steps down that linked list of objects, one object at a time and counts the number of objects which are PBs and the number of objects which are MTBs (step 348). At each object, BuildTables 330 checks whether its type is OT_PLACEBLOCK or OT_MTEXTBLOCK. If the object is a PB, BuildTables 330 increments internal variable nPB and if it is an MTB, BuildTables 330 increments internal variable nMTB. After BuildTables 330 has traversed the entire linked list, the final values of nPB and nMTB represent the total number of PBs and MTBs, respectively, within linked list 210.

Then, BuildTables 330 allocates the proper amount of memory for the tables by calling a myAlloc function. First, it allocates memory for PBTable in an amount equal to (nPB+1), sizeof(PBTABLE), where sizeof(PBTABLE) equals the memory required for a single entry (step 356). Then, the value of nPB is stored in nPB field 120 (step 358). Next, BuildTable 330 allocates memory for MTBTable in an amount equal to (nMTB+1) * sizeof(PBTABLE) (step 360). And, it then stores the value of nMTB in the nMTB field 124 (step 362).

After memory has been allocated for the tables, BuildTables 330 fills the tables in with information from the Master Page. It does this by again stepping down the linked list of objects for the Master Page one object at a time and storing the pertinent information into the appropriate entries of PBTable 130 and MTBTable 150. Initially, it sets nPB and nMTB to zero and sets pObj equal to the pointer to the first object on the Master Page (i.e., FirstObject) (steps 364–368). Then, it begins moving down the linked list of objects (step 370). At each object, BuildTables 330 checks whether its type is OT_PLACEBLOCK (step 372). If the current object is a PB, BuildTables 330 increments nPB (step 374), sets the pPBObj field 132$b$ in the PBTable entry 132 identified by nPB to pObj (step 376), stores the size and location of the object in PBRect 132$a$ (step 378), and sets pPBPage 132$d$ to point to the current Master Page (i.e., pmaster) (step 380). At the conclusion of this operation, the nPB$^{th}$ entry in PBTable 130 corresponds to the current PB in linked list 210.

If the current object in linked list is not a PB, BuildTables 330 checks whether its type is OT_MTEXTBLOCK (step 382). If the current object is an MTB, BuildTables 330 increments nMTB (step 384), sets the pMTBObj field 152$b$ in the MTBTable entry 152 identified by nMTB to pObj (step 386), stores the size and location of the object in MTBRect 152$a$ (step 388), and sets pMTBPage 152$d$ to point to the current Master Page (i.e., pmaster) (step 390). At the conclusion of this operation, the nMTB$^{th}$ entry in MTBTable 150 corresponds to the current MTB in linked list 210.

Then, BuildTables 330 moves onto the next object in linked list 210 and repeats the above-described steps until both PBTable and MTBTable are constructed (step 392).

After PBTable 130 and MTBTable 150 have been constructed, BuildTables 330 links in (i.e., associates) each dormant-associated object on the presentation page with the appropriate entry in one of the two tables. This involves setting the values of pLOCObj fields 132$c$ in each entry 132. BuildTables 330 sets the internal variable pObj to point to the first object on the presentation page (step 393) and then starts looking at each of the objects in linked list 110 (step 394). At each object, BuildTables 330 first determines whether the value in PB_id field 108$f$ is equal to zero (step 395). If it is not equal to zero, BuildTables 330 calls a PBLink function 430 (see FIG. 10) to associate that object with the appropriate PB (step 396). The operation of PBLink 430 will be described shortly.

If the entry in PB_id is equal to zero, BuildTables 330 then checks whether the value in MTB_id field 108$g$ is equal to zero (step 397). If it is not equal to zero, BuildTables 330 calls another function (i.e., MTBLink 450, see FIG. 12) to associate that object with the appropriate MTB (step 398). MTBLink 450 operates much like PBLink 430 does, but on MTBs rather than PBs.

BuildTables 330 repeats the above-described steps for each object in linked list until all objects are linked to the appropriate entries in either PBTable 130 or MTBTable 150. At that point, the tables are constructed and BuildTables 330 returns control to the calling function.

Note that in the functions described herein, the BuildTables function is called as a result of any change to the underlying TBs. Thus, any change to a TB results in dumping the existing tables and replacing them with new tables.

The FreeTables Function

The operation of FreeTables 400 is shown in FIG. 9. FreeTables 400 is called by BuildTables 330 as part of replacing the Master Page for a presentation page. It dormant-unlinks (i.e., makes dormant) any objects on the page that are in PBs or MTBs, and then frees the tables that contain PB and MTB information for the current Master Page.

When FreeTables 400 is called, it first checks whether there are any tables associated with the presentation page (step 402). If the presentation page has no tables (i.e., if both PBTable pointer 122 and MTBTable pointer 126 are null pointers), FreeTables 400 returns control to the calling function. If tables exist, FreeTables 400 uses FirstObject pointer 112 to find the beginning of linked list 110 (step 404) and then steps down linked list 110 one object at a time, unlinking each object (i.e., making each link dormant) as it progresses down the list (step 406). To perform the unlinking, FreeTables 400 calls another function, namely, UnlinkObj 480 (see FIG. 14). The operation of UnlinkObj 480 will be described shortly, so suffice it to say that this involves setting the dormant flags in PB_id and MTB_id fields 108$f$ and 108$g$ of the objects on the presentation page to True and setting pLOCObj pointers 132$c$ and 152$c$ in tables 130 and 150 to null.

After unlinking has been completed, FreeTables 400 checks if there is a PBTable (step 412). If one exists, FreeTables 400 calls a myFree function which frees the memory that was used for PBTable 130 (step 414), sets PBTable pointer 122 in page data structure 100 to null (step 416), and sets the value in of nPB field 120 to zero (step 418).

After freeing the memory that was allocated for the PBTable, FreeTables 400 does the same for MTBTable 150. First, it checks if there is an MTBTable (step 420).

If one exists, FreeTables 400 calls myFree to free the memory that was used for MTBTable 150 (step 422), sets MTBTable pointer 126 in page data structure 100 to null (step 424), and sets the value in nMTB field 124 to zero (step 426). Then, the operation of FreeTables 400 is complete and it returns control to the calling function.

The Linking Functions

The linking functions, PBLink 430 and MTBLink 450, link an object to a PB and an MTB, respectively. The call to each these functions must pass an "index" which identifies which PB (or which MTB) to link to, a pointer (pPage) to page data structure 100 for the presentation page that object resides on, and a pointer (pObj) to the object. If the object is linked to another PB or MTB, that link is removed first.

When a free floating object is pulled into a PB, PBLink 430 forces an association between the free floating object and the PB into which it has been pulled. That is, the free floating object takes on the attributes of the PB.

Referring to FIG. 10, when PBLink 430 is called, it first checks whether the index which was passed to it is greater than the total number of PB's in PBTable 130 (step 432). If it is, PBLink 430 terminates and returns control to the calling function. If the index is not greater than nPB, PBLink 430 calls UnlinkObj 480 (see FIG. 14) to eliminate any existing links associated with the object on the presentation page (step 434). After the existing links have been eliminated, PBLink 430 sets pLOCObj pointer 132c in PBTable 130 to point back to the object on the presentation page (i.e., pLOCObj=pObj) (step 436). Then, PBLink 430 sets the value of PB_id field 108f in object data structure 108 for the object on the presentation page equal to the index so that it identifies the proper entry in PBTable 130 (step 438). Finally, PBLink 430 calls another function, PBResizeObject 446 (see FIG. 11), to perform the required transformation (e.g. resizing and repositioning) on the object that has just become linked to the PB (step 440). That is, when an object on a given presentation page becomes associated with (i.e., linked to) a PB on a Master Page, it takes on the attributes of the PB and thus must be transformed in accordance with those new attributes.

More specifically, as shown in FIG. 11, PBResizeObject 446 updates the information in ObjectDim 108c of the appropriate object data structure 108.

Referring to FIG. 12, MTBLink 450 operates in approximately the same way as does PBLink, except that it links an object to an MTB, rather than to a PB. Another difference appears in the last step (i.e., step 460). When an object becomes associated with an MTB, not only its size and location might change but also other attributes such as the font size and the choice of typeface. In step 460, MTBLink calls an MTBCopyInfotoObject function 466 (see FIG. 13) which not only updates ObjectDim field 108c for the object but it also updates ObjectInfo field 108h. That is, it copies the attributes of the MTB into the object being linked. Objectinfo[0] specifies the font which is to be used. And Objectinfo[1] specifies the typeface which is to be used.

Recall that ObjectInfo fields contain two categories of information, namely, the contents of the object (e.g. text, a figure or a chart) and the attributes or characteristics of the object. The attributes may relate to the text within the object and may include, for example, typeface, font size, color of the text, color of background, bullet style, indents, line spacing, appearance (e.g. plain, bold, italic, underline, etc.), right justification, vertical justification, word wrap, etc. The attributes may also be those of the rectangle that defines the outer border of the object (e.g. the color width and style of the border). Thus, although the above example only includes font and typeface, it should be understood that any combination and any number of the above attributes as well as others that might be associated with a graphical object may be specified in the ObjectInfo fields. MTBCopyInfotoObject 466 copies all of the specified attributes from the MTB into the object being linked to it but leaves the contents of the object undisturbed.

The Unlinking Function

Referring to FIG. 14, UnlinkObj 480 unlinks an object from a PB or an MTB. It either eliminates the link completely or, it makes the link dormant, depending upon the state of a makeDormant flag that is passed to the function when it is called. The function may be called if either a dormant link or no link at all exists for the object.

The function which calls UnlinkObj 480 passes a pointer (pPage) to page data structure 100 for the presentation page, a pointer (pObj) to the object that is being unlinked and a value for the makeDormant flag, indicating whether to eliminate the link completely or make it dormant. UnlinkObj 480 begins by setting an internal index, labelled "index", equal to the value found in PB_id field 108f of the object (step 482). That is, UnlinkObj 480 retrieves the link information for the object. If both the value in PB_id field 108f and the makeDormant flag are non-zero, UnlinkObj 480 sets the dormant flag in PB_id 108f to True, thereby making the link dormant (step 488). On the other hand, if the value in PB_id field 108f is non-zero but the makeDormant flag is False (i.e., zero), UnlinkObj 480 sets the value in PB_id field 108f equal to zero, thereby eliminating the link (step 490).

If the dormant flag of the original entry in PB_id field 108f was set to false (i.e., it did not already have a dormant link) and index is less than or equal to nPB, the number of entries in PBTable 130, UnlinkObj 480 also sets pLOCObj pointer 132c in PBTable 130 to null (steps 492-494). This breaks the link in PBTable 130 back to the object which is being unlinked.

After processing the link to a PB, UnlinkObj 480 checks whether there is a link to an MTB (steps 496 and 498). If there was a link to a PB, a link to an MTB will not exist and the function will terminate at this point. On the other hand, if there was no link to a PB, there may be a link to an MTB. Such a link will be detected by this portion of the code and eliminated (or made dormant) in much the same way as the code in steps 484 to 494 handled the link to a PB.

Manipulating Objects

The user may manipulate objects on pages, whether they be presentation pages or Master Pages, by using a mouse. The processing of mouse commands is handled by repeatedly invoking a switch statement (in C Programming Language) which branches to the appropriate code depending upon the message type or command which was received. There are three pertinent messages which the user can generate with the mouse, namely, WM_LBUTTONDOWN, WM_MOUSEMOVE and WM_LBUTTONUP. Depressing the left mouse button (e.g. clicking the mouse on an object) generates the WM_LBUTTONDOWN; moving the mouse generates a WM_MOUSEMOVE message; and releasing the mouse left button generates the WM_LBUTTONUP message. These three messages invoke, respectively, the following three routines: ButtonDown 500, MouseMove 530, and ButtonUp 560 (see FIGS. 15-17). The operation of each of these routines will now be described.

Referring to FIG. 15, when the user has clicked the mouse button down, the windowing environment detects the resulting WM_LBUTTONDOWN message and invokes ButtonDown routine 500. ButtonDown 500 immediately checks whether capture has already occurred through some earlier operation (step 502). That is, it checks HasCapture field 250i in INST data structure 250. If HasCapture field 250i contains a True value, it returns control to the window process so that it may process the next received command. If HasCapture field 250i is False, ButtonDown 500 calls a MAKEPOINT utility to determine the x and y coordinates of the location of the mouse cursor within the displayed window (step 504). Next, it invokes a GetHitObject function 660 (see FIG. 22) to determine whether the mouse cursor is located within an object (i.e., whether it has captured or picked up an object) (step 506). ButtonDown 500 passes a pointer to the current page and the x and y coordinates of the mouse cursor to GetHitObject 660. If an object has been hit, GetHitObject 660 marks the object as having been selected and returns a True to the calling routine. If no object was hit, GetHitObject 660 returns a False and returns control to the windowing environment.

If an object was hit, ButtonDown 500 notifies the window process through a SetCapture instruction that it owns the mouse (i.e., no other process can use the mouse until it is released) (step 508). Then, ButtonDown 500 asks the window process to change the appearance of the cursor, thereby providing visual confirmation to the user that a move object operation has been initiated (step 510). Next, ButtonDown 500 updates the entry in HasCapture field 250i of INST data structure 250 to contain a True value (step 512), and it notifies the windowing environment through a GetDC instruction that it is about to paint on the screen (step 514).

After the windowing environment has been prepared for painting on the screen, ButtonDown 500 calls a PaintIntransitObject function to paint a dashed outline of the object which has been captured by the mouse (step 516).

After the object has been highlighted, ButtonDown 500 notifies the windowing environment through a ReleaseDC instruction that painting of the screen has been completed (step 518). Then, control is returned to the window process so that it may process subsequent messages and/or commands (step 520).

Referring now to FIG. 16, MouseMove 530 performs two basic functions. It moves the captured object to a new location identified by the mouse and it highlights whatever PB or MTB the moved object has entered. When a mouse move message is received and MouseMove 530 is invoked, it first checks whether the mouse actually has capture of an object (step 532). If no object has been captured, MouseMove 530 terminates. If an object has been captured, MouseMove 530 calls the MAKEPOINT utility to determine the x and y coordinates of the mouse cursor on the screen (step 534) and notifies the window process in preparation for painting on the screen (step 536).

Once the windowing environment has been prepared for painting on the screen, MouseMove 530 calls the PaintIntransitObject routine which erases the outline of any object which had been highlighted by a previous call to PaintIntransitObject (step 538). After the object outline has been erased (i.e., the highlight border erased), MouseMove 530 calls a MoveIntransitObject function to compute the new location of the object (step 540). The MoveIntransitObject function updates the entry in ObjectDim field 108c (or 208c) of the object being manipulated by the mouse. After the object has been moved, MouseMove 530 again calls the PaintIntransitObject routine to highlight the outline of the intransit object at its new location (step 542).

After moving and highlighting the object, MouseMove 530 determines whether the object has entered a PB by calling a PBLightHit function 600 (see FIG. 18) (step 544). As will be described in greater detail later, the call to PBLightHit 600 determines whether the cursor is within the boundaries of a PB on the Master Page which has been assigned to the current presentation page. If a hit has occurred, PBLightHit 600 highlights the contour of that PB by drawing a border a few pixels outside of its actual border and then it returns a True. Next, MouseMove 530 calls an MTBLightHit function 645 (see FIG. 20) (step 546). If PBLightHit 600 returned a True, the call to MTBLightHit 645 is such that it erases any highlighting of any MTB. That is, a hit on a PB takes precedence over a hit on an MTB. If PBLightHit 600 had returned a False, MTBLightHit 645 determines whether an MTB has been hit. If an MTB has been hit, its contour is highlighted and a True is returned. Then, MouseMove 530 notifies the windowing environment that painting on the screen has finished (step 548).

When the user has completed the mouse move and releases the mouse button, a WM_LBUTTONUP message is sent invoking ButtonUp function 560 in FIG. 17. ButtonUp 560, like the two previously described mouse-related routines, first checks whether the mouse had capture on an object (step 562). If the mouse has capture of an object, ButtonUp 560 restores the cursor to its original appearance before the mouse button was depressed (step 564) and it notifies the window process that the function no longer owns the mouse (step 566). ButtonUp 560 then clears HasCapture Flag 250i in INST data structure 250 (step 568) and prepares the windowing environment for painting on the screen (step 570).

After preparation for painting on the screen is complete, ButtonUp 560 calls the PaintIntransitObject function to erase any border which had been painted during the last mouse move by a previous call to the PaintIntransitObject function (step 572). After the border highlights have been erased, ButtonUp 560 calls an EndIntransitOperation (EndIntransit) function 720 (see FIG. 24) (step 574). EndIntransit 720 implements the changes which the mouse move requires. It eliminates the intransit object data structure, moves the original object to its final position as determined by the mouse, determines whether the moved object is within a PB or an MTB, and if so, "snaps" the moved object into the container defined by that PB or that MTB, whichever the case may be.

After the moved object has been properly updated, ButtonUp 560 erases any existing highlights surrounding any PB's or MTBs (steps 578 and 580) and then notifies the windowing environment it has finished painting on the screen (step 582). Before ending, ButtonUp 560 instructs the window process through an InvalidateRect instruction to repaint the screen so as to display the moved object in its new position (step 584).

The PBLiqhtHit and MTBLightHit Functions

When an object is being dragged into an empty PB or MTB, the PB or MTB highlights to provide visual feedback to the user. Once the drag is completed, the highlighting may be turned off. To accomplish these tasks, code is present in a mouse related routine (i.e. MouseMove 530 and ButtonUp 560) to call one of two utility functions, namely, PBLightHit 600 or MTBLightHit 645 Each of these will now be described Referring to FIG. 18, PBLightHit 600 is called while an object is in the process of being moved. It highlights the PB (if any) that the object is being dragged into and unhighlights the PB (if any) that the object is being dragged out of.

The call to PBLightHit 600 passes four pieces of information to the function. The call passes (1) information that was supplied by the windowing environment and is required to paint on the screen, (2) a pointer to page data structure 100 for the current presentation page, (3) the coordinates of the mouse cursor, and (4) a boolean variable (i.e., designated hilite). The hilite variable tells PBLightHit 600 whether to highlight the object which is hit.

When PBLightHit 600 is invoked, it initializes an internal variable (i.e., "hit") to zero and then makes sure that a valid pointer to a page data structure was passed to it (steps 602 and 604). If pPage is not a null pointer, PBLightHit 600 sets an internal pointer pSELObj equal to HitObject pointer 114 from data structure 100 (step 606). Then, it calls a PBHit function 620 (see FIG. 19) to determine if the cursor has fallen within the boundaries of an available PB on the associated Master Page (step 608). If the cursor does fall within the boundaries of a PB, PBHit 620 returns the index of the PB which was hit and PBLightHit 600 sets internal variable "hit" equal to this returned value.

Then, PBLightHit 600 steps back through the array of PBs (i.e., PBTable 130), highlighting the hit PB while it proceeds and unhighlighting any other PB's that might have been previously highlighted (step 610). More specifically, PBLightHit 600 sets an internal variable "index" equal to the value stored in nPB field 120 of page data structure 100. Then, it checks whether both the hilite flag is True and the index equals the value of the hit variable (i.e., whether the index equals the identity of the PB that was hit) (step 612). If both conditions are satisfied, PBLightHit 600 highlights the corresponding PB (step 614). Otherwise, PBLightHit 600 turns off any highlighting that might have been turned on for that PB (step 616). Then, PBLightHit 600 decrements index and repeats the same steps for the next lower PB in PBTable 130. After PBLightHit 600 has stepped back through all entries 132 in PBTable 130, it returns the value of hit to the routine which called it (step 618).

Referring to FIG. 19, PBHit 620, one of the functions invoked by PBlightHit 600, determines whether the selected object has been dragged into a PB on the Master Page. If it has, PBHit 620 returns the index of the PB to which the object should be linked. If it has not, PBHit 620 returns a zero to the calling function.

The call to PBHit 620 passes a pointer (pPage) to the data structure for the current page, a pointer (pSELObj) to the object which is being dragged, and the location (pt.) of the mouse cursor. PBHit 620 initializes an internal variable (ie., "hit") to zero and checks whether it has received a valid pointer to a page data structure (i.e., non-zero) (steps 622 and 624). Since PB's and MTB's cannot go into another PB (i.e., they cannot be linked to another PB), PBHit 620 checks whether the object type as specified in ObjectType field 208b is either OT_PLACEBLOCK or OT_MTEXTBLOCK (step 626). If it is either of those, PBHit 620 returns a zero to the calling function (step 628). If the dragged object is neither a PB nor an MTB, PBHit 620 walks back through PBTable 130 from the last entry to the first and checks whether the mouse cursor falls within any of the PBs in the table (step 630). For each entry examined during this backward search through PBTable 130, PBHit 620 sets an internal pointer pLOCObj equal to the value of pLOCObj 132c for that particular entry (step 632). Then, PBHit 620 checks whether pLOCObj is other than a null pointer and whether it is not equal to pSELObj (step 634). That is, PBHit 620 checks whether the PB is in use by another object. If the PB is in use by another object, PBHit 620 moves on to the next entry in PBTable 130.

If the PB is not in use by another object, PBHit 620 uses a utility function available from the windowing environment (i.e., PtInRect) to determine whether the cursor falls within the region of the PB as defined by the information stored in PBRect field 132a of that entry in PBTable 130 (step 636). If the cursor fall within that PB, PBHit 620 returns index (i.e., the number of that PB entry in PBTable 130) (step 638). If the mouse cursor does not fall within any of the PBs in PBTable 130, PBHit 620 returns a zero to the calling function (step 640).

The operation of MTBLightHit 645 and MTBHit 650 are shown in FIGS. 20 and 21, respectively. As should be apparent by comparing their operation to that of their counterparts for PBs, they are similar to PBLightHit 600 and PBHit 620, respectively. The main difference between PBLightHit 600 and MTBLightHit 645 is the object type that they operate on. With regard to MTBHit 650, it contains code (step 652) which permits only text objects (i.e., type OT—TEXT) to be dragged into and linked to an MTB.

The GetHitObect Function

Referring to FIG. 22, when the mouse button is depressed, GetHitObject 660 is called to determine whether an object has been captured. GetHitObject 660 not only reports whether a hit has occurred, but if a hit has occurred, it also updates the appropriate data structures to reflect details about the hit. The details of its operation are as follows.

The call to GetHitObject 660 passes a pointer to the current page and the location of the cursor. Assuming that the mouse is on a page, GetHitObject 660 responds by setting HitObject pointer to null (step 662) and setting another internal pointer (pObj) to point to the first object in the linked list of objects associated with that page (step 664). Then, GetHitObject 660 proceeds down the linked list of objects (step 666), and for each object, checks whether the cursor is within that object's boundaries as they are defined by the information stored in ObjectDim field 108c (step 668). To make its determination, GetHitObject 660 calls a utility routine, PtInRect, to which it passes the location of the cursor (pt.) and the address of the information specifying the area that the object occupies. If the cursor is inside of the object, GetHitObject 660 sets HitObject pointer 114 to point to that object (step 670). Then, GetHitObject 660 moves on to the next object in the linked list (step 670).

Of course, more sophisticated approaches could be used within GetHitObject 660. One could determine whether the cursor touches the graphical object itself rather than merely being within the rectangle surrounding the object. For example, if the graphical object was a circle, a hit would occur if the cursor is on or in the circle. Routines for making such determinations are well known to those skilled in the art.

At the conclusion of the search through the linked list, HitObject pointer 114 points to the last object in the linked list that is hit by the pointer, if any.

Then, GetHitObject 660 sets its internal pointer pObj equal to the value of HitObject pointer 114 and checks whether it is a null pointer (steps 674–676). If pObj is a null pointer, indicating that the cursor is not within any object, GetHitObject 660 calls a DeSelectAllObjects routine 700 (see FIG. 23) to deselect all objects in the linked list (step 678). That is, DeSelectAllObjects 700 sets ObjectSel flag 108d in each object to False, indicating that no object has been selected by the mouse. Then, GetHitObject 660 returns a False to the calling function to report that a hit did not occur (step 680).

If there is a hit object that was already selected (i.e., if pObj is not a null pointer), GetHitObject 660 deselects all objects (step 684) and sets ObjectSel flag 108d in the hit object to True (step 686). Next, GetHitObject 660 calls a CopyObject utility to generate a copy of the hit object and set IntransitObject pointer 116 in page data structure 100 to point to that copy. Note, however, that the copy does not necessarily contain all of the information found in the original object. It might contain, as is the case in the described embodiment, only an outline of the box surrounding the object but no details about what is within the box (e.g., the actual text or the graphical object itself).

Finally, GetHitObject 660 sets the values in OrigPt field 250j and PrevPt field 250k of INST data structure 250 equal to the location of the mouse cursor (steps 690 and 692) and returns a True to the calling function.

The EndIntransit Function

Referring to FIG. 24, EndIntransit 720 implements the changes to dragged object that were brought about by the mouse move. The call to EndIntransit passes a pointer to the data structure for the current page (pPage). EndIntransit 720 responds by first computing the net shift in both the x and y directions of the mouse since the user first clicked on the object (steps 722 and 724). The net shift in the x direction is equal to the difference between the x components of the entries in PrevPt and OrigPt fields 250k and 250j of INST data structure 250. Similarly, the net shift in the y direction is equal to the difference between the y components of the entries in PrevPt and OrigPt fields 250k and 250j. Then, EndIntransit 720 sets an internal pointer (pIntransitObj) equal to the IntransitObject pointer in the page data structure (step 726). Thus, pIntransitObj points to a copy of the object that was being dragged by the mouse.

Next, EndIntransit 720 calls a GetSelectedObject utility which searches down the linked list of objects on the presentation page to find the object which the user clicked on (i.e., the selected object) (step 728). The selected object is identified by a True flag in the ObjectSel field 108d of the object. GetSelectedObject returns a pointer to the object and EndIntransit 720 saves this pointer as pObj. After the values for IntransitObj and pObj are established, EndIntransit 720 calls a MoveSizeObject utility which moves the selected object by the amount determined by the net x and y shifts that were computed in steps 722 and 724. MoveSizeObject updates the information in ObjectDim field 108c of the object by shifting the rectangle which defines the contour of the object by the appropriate amount.

After EndIntransit 720 updates the location of the selected object, it calls another function, namely, PBObjectMoved 750 (see FIG. 25) (step 732). This function checks whether the selected object has been dragged into a PB or an MTB, and if so, it sets up the proper link for the selected object (i.e., it associates the selected object with the particular PB or MTB that it has been dragged into.)

Next, EndIntransit 720 calls a PBObjectEdited function 780 (see FIG. 26) which checks whether the object which was moved was either a PB or an MTB (step 734). If the object happens to be a PB or an MTB (i.e., involving a Master Page), then any pages that use this page as a master need to be updated. PBObjectEdited 780 takes care of marking those pages as needing update.

Before returning control to the calling function, EndIntransit 720 calls a DelObject utility which deletes the copy of the intransit object and sets IntransitObject pointer to null (step 736).

Referring to FIG. 25, PBObjectMoved 750 is called whenever an object is moved. It checks to see whether the object has been dragged into or out of a PB or an MPB, and if so, it sets up the proper links to that PB or MTB. PBObjectMoved 750 first calls PBHit 620 (see FIG. 19) to determine the index of the PB which the selected object has been dragged into, if any (step 752). The value returned by PBHit 620 is stored as an internal variable "hit". PBObjectMoved 750 checks whether "hit" has a non-zero value, i.e., whether an actual object was hit (step 754). If an object was hit, PBObjectMoved 750 checks whether the selected object is already associated with the hit object by comparing hit to the value in PB_id field 108f of object data structure 108 for that object (step 756). If the selected object does not already have a link to the hit object, PBObjectMoved 750 calls PBLink 430 (see FIG. 10) to create a link between the selected object and the hit object (step 758). Then, PBObjectMoved 750 returns control to the function which called it (step 760).

If PBObjectMoved 750 did not find any PBs which were hit, it calls MTBHit 650 (see FIG. 21) and performs the same set of operations for MTBs. (steps 762–720).

If the selected object has not been moved into either a PB nor an MTB, PBObjectMoved 750 checks whether the object currently contains an active link to either a PB or an MTB (step 772). If an active link exists, indicating that the object has been dragged out of a PB or an MTB, PBObjectMoved 750 calls UnlinkObj 480 (see FIG. 14) to eliminate that link (step 774).

Referring to FIG. 26, PBObjectEdited 780 is called whenever an object on a Master Page is modified in any way or whenever an object of any type is moved. If the modified object happens to be a PB or an MTB, then any pages which use the object must be marked as out of date. PBObjectEdited 780 takes care of this housekeeping task.

The call to PBObjectEdited 780 passes a pointer to INST data structure 250, a pointer to the page data structure for the page on which the selected object resides and a pointer to the selected object. When invoked, PBObjectEdited 780 checks whether the object type of the selected object (as identified in its ObjectType field 108*b* or 208*b*) is either OT_PLACEBLOCK or OT_MTEXTBLOCK (step 782). If it is neither a PB nor an MTB, control is returned to the calling function. On the other hand, if it is either a PB or an MTB, PBObjectEdited 780 gets the pointer to the first presentation page from the PresPages field 250*g* in INST data structure 250 and stores this as an internal pointer (pPage) (step 784).

Next, PBObjectEdited 780 looks at each of the pages in linked list 102 of presentation pages (step 786). For each page, PBObjectEdited 780 calls a UsesThisMaster utility which compares the contents of MasterPage field 106 of that record to a pointer to the Master Page which was modified (step 788). If the two pointers are the same, indicating that the presentation page uses the Master Page which was changed and therefore must itself be updated, PBobjectEdited 780 sets OutofDate flag 118 in page data structure 100 to True (step 790). After PBObjectEdited 780 completes its search down the linked list of presentation pages, it returns control to the calling function.

Painting to the Screen

Whenever a new window is brought up on the screen display by the user or whenever InvalidateRect is invoked, a paint window message is generated. The paint window message, in turn, invokes a PaintPage function 800 (see FIG. 27) in the presentation manager. The call to PaintPage 800 passes a pointer to a page data structure for the current page and an "isMaster" flag, indicating whether the current page is a Master Page. Upon being invoked, PaintPage 800 checks whether a null pointer was passed to it and, if one was, it returns to the calling function (step 802). If a valid page data structure pointer was received, PaintPage 800 invokes itself. In the call to itself, it passes a pointer to the Master Page data structure that is associated with the current page (i.e., the MasterPage pointer found in the page data structure) and an isMaster Flag set to True (step 804). As will become apparent in the following description, this call to itself causes all of the graphical objects on the Master Page to be displayed (under any objects that are being displayed on the presentation page, if a presentation page is being displayed).

Then, PaintPage 800 checks whether the OutofDate flag in the current page is set to True (step 806). If it is True, PaintPage 800 invokes BuildTables 330 (see FIG. 8*a–b*) to rebuild the PBTable and the MTBTable to reflect the modifications that were made to the underlying TBs (step 808). After rebuilding the tables, PaintPage 800 finds the first object on the current page (i.e., the object identified by the FirstObject pointer) (step 810) and moves down the linked list of objects one object at a time (step 812). For each object, PaintPage 800 calls a PaintObject routine passing a pointer to the current page and the current value of isMaster to it (step 814). If the current page is a Master Page (i.e., isMaster is True), the PaintObject routine paints the object only if it is neither a PB nor an MTB.

After painting all appropriate objects on the current page, PaintPage 800 checks whether isMaster is True (step 818). If the current page is a Master Page (i.e., isMaster is False), PaintPage 800 returns control to the calling function. On the other hand, if the current page is not a Master Page, PaintPage 800 calls a PaintEmptyMasterObjects function 850 (see FIG. 28) to paint all of the TBs which are not associated with an object (step 820). Note that since the empty TBs are painted after the objects on the presentation page, they will overlay those objects and not be obstructed by them.

After painting all of the empty TBs, PaintPage 800 goes to the first object on the current page (step 822) and then moves down the linked list of objects on that page one object at a time (step 824). For each object, PaintPage 800 calls a PaintObjectHiLight function which determines whether the object is a selected object, and if it is, paints a highlight on the object. Recall that the highlight of a selected object is four small rectangles, one at each of the four corners of the bounding box of the object.

Finally, PaintPage 800 calls the previously mentioned PaintIntransitObjects function to highlight any intransit objects (step 828).

Referring to FIG. 28, when PaintEmptyMasterObjects 850 is invoked, it steps through the PBTable for the current page (step 852) and for each entry in the PBTables, it checks whether the entry has a link to an object on the page (i.e., is pLocObj a null pointer?) (step 854). If there is no link (i.e., the PB is empty), function 850 calls the PaintObject routine to paint that PB (step 856). In the described embodiment, an empty PB (and an empty MTB) contains a large X connecting the four corners of the rectangle and a user prompt. Thus, when the PaintObject routine paints a PB, it appears on the screen as a rectangle with an X through it and the user prompt appears inside of it.

After function 850 has painted all empty PB's on the Master Page that is associated with the current page, it performs the same sequence of operations on the entries in the MTBTable (steps 858–862).

An example of a program which implements an embodiment of the invention is presented in Appendix I, which is a source code listing in C language.

Other embodiments are within the following claims. For example, software which implements an embodiment of the above-described invention is Freelance Graphics for OS/2 developed and sold by Lotus Development Corporation, and incorporated herein by reference. The operation of that particular embodiment is described in two documents entitled Freelance Graphics for OS/2: User's Guide (First Edition) and Freelance Graphics for OS/2: Reference (First Edition), both of which are also incorporated herein by reference.

Though the described embodiment did not include the ability to assign a Master Page to another Master Page, this capablility could be added. The modifications that must be made to the above-described data structures (primarily their extension) to support that capability are straightforward. For example, the data structure for a Master Page would include a valid pointer to a data structure for the other Master Page that is assigned to that Master Page, and it would include pointers to a PBTable and an MTBTable which contain all of the TBs appearing on the other Master Page.

FIG. 29 illustrates a screen image of a page 1000 of a mulit-page presentation. The page defines a work area 1001 that includes a graphical object 1002 and a container object 1004, both of which have corresponding sizes and placements on the page. The container object, which can be either a text block or a placement block, is shown here as a text block. The container object is associated with the page and has a set of specified characteristics or preselected attributes, e.g. bold regular style typeface, large font size, black color on a white background, bullet style, spacing, justification, word wrap, border style, color and width. The graphical object contains text also having a set of specified characteristics which may be different from the set of specified characteristics of the text block, e.g. italics style, a small font size, and a different border style. When the graphical object is captured, the system highlights it by, for example, surrounding it with a dashed line. With the aid of the mouse which controls a pointer or cursor 1006 on the display, the user can capture and drag the graphical object into the container object (note that the dragging is represented by the sequence of dashed representations of the graphical object). As the graphical object is being dragged it is referred to as an intransit object and is highlighted by the dashed outline. When it enters the container object, the container object is highlighted by, for example, corner brackets. When graphical object is released in the container object into which it was dragged, it takes on the specified characteristics associated with the container object. In this example, when the dragged text object is released in the container object, the text changes from text in small italics characters to text in large bold characters.

APPENDIX I

```
1: #include <windefs.h>
2: #include <windows.h>
3: #include "mbres.h"
4:
5: #define INT     int
6: #define LONG    long
7: #define BOOL    short
8: #define BYTE    char
9: #define FIXED   long
10:                 /* FROM OS2DEF.H */
11: typedef unsigned short USHORT;  /* us */
12: typedef unsigned long ULONG;    /* ul */
13: #define LOUSHORT(l)    ((USHORT)(l))
14: #define HIUSHORT(l)    ((USHORT)(((ULONG)(l) >> 16) & 0xffff))
15:
16: #define UNUSED(x) (x = x)      /* For unreference var warnings */
17:
18: #define NC_MAX_PATH_NAME 255
19: #define MAXSTRLEN 81
20:
21: #define strcat(to, from) lstrcat(to, from)
22: #define strcpy(to, from) lstrcpy(to, from)
23:
24: #define OT_MTEXTBLOCK   1
25: #define OT_PLACEBLOCK   2
26: #define OT_TEXT         3
27: #define OT_RECTANGLE    4
28:
29: #define DORMANT_FLAG    0x4000
30: #define HIGHLIGHT_SIZE 3
31:
32: #define HILITE_SELECT   0x01        /* bit to indicate type of highlight */
33: #define HILITE_PB       0x02        /* bit to indicate type of highlight */
34:
35: typedef struct _GOBJECT{
36:     struct _GOBJECT FAR *NextObject;
37:     INT       ObjectType;
38:     RECT      ObjectDimensions;
39:     BOOL      ObjectSelected;
40:     INT       Highlight;
41:     INT       PB_id;
42:     INT       MTB_id;
43:     WORD      size;
44:     WORD      face;
45:     char      userString[ MAXSTRLEN ];
46: } GOBJECT, FAR *PGOBJECT;
47:
48: typedef struct _PBTABLE{
49:     RECT            PBRect;  /* dimensions of the PB           */
50:     PGOBJECT        pPBObj;  /* pointer to the PB (on another pg)*/
51:     PGOBJECT        pLocObj; /* pointer to local obj using pb  */
52:     struct _GPAGE FAR *pPBPage; /* LPGPAGE pointer to page PB is on */
53: } PBTABLE, FAR *PPBTABLE;
54:
55: typedef struct _GPAGE{
56:     struct _GPAGE FAR *NextPage;
57:     struct _GPAGE FAR *MasterPage;
58:     PGOBJECT          FirstObject;
59:     PGOBJECT          HitObject;
60:     PGOBJECT          FirstIntransitObject;
61:     BOOL              PBsOrMTBsOutofDate;
62:     INT       nPB;
63:     PPBTABLE          PBTable;
64:     INT       nMTB;
65:     PPBTABLE          MTBTable;
```

```
66: } GPAGE, FAR *PGPAGE;
67:
68: typedef struct {
69:       HANDLE       hInst;
70:       HWND         hWnd;
71:       PGPAGE       CurrPage;
72:       PGPAGE       CurrPPage;
73:       PGPAGE       CurrMPage;
74:       PGPAGE FAR   *pCurrPgList;
75:       PGPAGE       PresPages;
76:       PGPAGE       MasterPages;
77:       BOOL         HasCapture;
78:       POINT        OrigPt;
79:       POINT        PrevPt;
80: } INST, FAR *PINST;
81:
82: int PASCAL WinMain(HANDLE hInstance, HANDLE hPrevInstance,
83:      LPSTR lpszCmdLine, int nCmdShow);
84: BOOL InitApplication( HANDLE hInstance );
85: BOOL InitInstance( HANDLE hInstance, int nCmdShow );
86: long FAR PASCAL MainWndProc( HWND hWnd, unsigned message, WORD wParam,
87:           LONG lParam);
88: BOOL FAR PASCAL About(HWND hDlg, unsigned message, WORD wParam,
89:           LONG lParam);
90: void OutOfMemory(void);
91: int MyGetClipFmtName( WORD wformat, LPSTR fmtname, int maxcount );
92:
93: void AddPage( void );
94: void GotoPage( WORD n );
95: void AssignMaster( PGPAGE pPage, WORD n );
96: void SetTextAttrib( PGPAGE pPage, WORD i );
97: BOOL GetHitObject( PGPAGE pPage, POINT pt, BOOL bAddToSelection );
98: void EndIntransitOperation( PGPAGE pPage );
99: void MoveIntransitObjects( PGPAGE pPage, POINT pt );
100: void MoveSizeObject( PGPAGE pPage, PGOBJECT pObj, POINT pt );
101: void DelObject( PGOBJECT FAR *pObjList, PGOBJECT pObj );
102: void DeselectAllObjects( PGPAGE pPage );
103: PGOBJECT CopyObject( PGPAGE pPage, PGOBJECT pObj, BOOL Intransit );
104: void AddObject( PGPAGE pPage, INT ObjectType );
105: void DeleteSelectedObjects( PGPAGE pPage );
106: void PaintIntransitObject( HDC hdc, HPEN hPen, PGOBJECT pObj );
107: void HighlightObj( HDC hdc, PGOBJECT pObj, INT hiliteStyle );
108: void UnhighlightObj( HDC hdc, PGOBJECT pObj, INT hiliteStyle );
109: void PaintObjectHilight( HDC hdc, PGOBJECT pObj );
110: void PaintObject( HDC hdc, PGOBJECT pObj, BOOL skipMasterObjs );
111: void PaintIntransitObjects( HDC hdc, PGPAGE pPage );
112: void PaintEmptyMasterObjects( HDC hdc, PGPAGE pPage );
113: void PaintPage( HDC hdc, PGPAGE pPage, BOOL withHighlight );
114: BOOL MultipleObjectsSelected( PGPAGE pPage );
115: PGOBJECT GetNextSelectedObject( PGPAGE pPage, PGOBJECT pObj );
116: void GetCtrlRect( LPRECT pObjRect, INT i, LPRECT pCtrlRect );
117: LPVOID myAlloc( WORD size );
118: void myFree( LPVOID );
119:
120: void UnlinkObj( PGPAGE pPage, PGOBJECT pObj, BOOL makeDormant );
121: void PBLink( PGPAGE pPage, PGOBJECT pObj, INT index );
122: void MTBLink( PGPAGE pPage, PGOBJECT pObj, INT index );
123: void BuildPBTables( PGPAGE pPage );
124: INT PBLightHit( HDC hdc, PGPAGE pPage, POINT pt, BOOL hilite );
125: INT PBHit( PGPAGE pPage, PGOBJECT pSelObj, POINT pt );
126: INT MTBLightHit( HDC hdc, PGPAGE pPage, POINT pt, BOOL hilite );
127: INT MTBHit( PGPAGE pPage, PGOBJECT pSelObj, POINT pt );
128: void PBObjectMoved( PINST pInst, PGPAGE pPage, PGOBJECT pObj, POINT pt );
129: void PBObjectEdited( PINST pInst, PGPAGE pMaster, PGOBJECT pObj );
130: void MarkUsersOutofDate( PINST pInst, PGPAGE pMaster );
131: BOOL IsPBLinkedActive( PGOBJECT pObj );
132: BOOL IsMTBLinkedActive( PGOBJECT pObj );
133: BOOL UsesThisMaster( PGPAGE pPage, PGPAGE pMaster );
134: INT CountSelectedObjects( PGPAGE pPage );
135:
136:
137:

1: #define IDM_ABOUT 100
2:
3: /* file menu items */
4:
5: #define     IDM_NEW      101
6: #define     IDM_OPEN     102
7: #define     IDM_SAVE     103
8: #define     IDM_SAVEAS   104
9: #define     IDM_PRINT    105
10: #define    IDM_EXIT     106
```

```
11:
12: /* view menu */
13: #define IDM_VNONE    140
14: #define IDM_VMETA    141
15: #define IDM_VFORMATS   142
16: #define IDM_VINFO    143
17: #define IDM_VMETAFIT   144
18:
19: #define IDM_VMPGS    145
20: #define IDM_VPPGS    146
21: #define IDM_VNEXTPG  147
22: #define IDM_VPREVPG  148
23: #define IDM_VGOTO    149
24:
25: /* add menu */
26: #define IDM_ARECT    150
27: #define IDM_ATEXT    151
28: #define IDM_APBLK    152
29: #define IDM_AMTBLK   153
30:
31: /* settings menu */
32: #define IDM_SCOLOR   160
33: #define IDM_STEXT    161
34:
35: /* page menu */
36: #define IDM_PNEW     170
37: #define IDM_PDELETE  171
38: #define IDM_PMASTER  172
39: #define IDM_PMASTER0   173
40: #define IDM_PMASTER1   174
41: #define IDM_PMASTER2   175
42: #define IDM_PMASTER3   176
43: #define IDM_PMASTER4   177
44:
45: #define IDM_PAGE1    180
46: #define IDM_PAGE2    181
47: #define IDM_PAGE3    182
48: #define IDM_PAGE4    183
49:
50: #define IDM_SSMALL   184
51: #define IDM_SMEDIUM  185
52: #define IDM_SLARGE   186
53: #define IDM_FROMAN   187
54: #define IDM_FSWISS   188
55: #define IDM_FMODERN  189
56: #define IDM_FDEFAULT 190
57:
58: /* edit menu items */
59:
60: #define       IDM_UNDO    200
61: #define       IDM_CUT     201
62: #define       IDM_COPY    202
63: #define       IDM_PASTE   203
64: #define       IDM_CLEAR   204
65:
66: #define       IDM_UPDATE  210
67:
68: #define       IDC_OBJTEXT 111
69:
70: int PASCAL WinMain(HANDLE, HANDLE, LPSTR, int);
71: BOOL InitApplication(HANDLE);
72: BOOL InitInstance(HANDLE, int);
73: long FAR PASCAL MainWndProc(HWND, unsigned, WORD, LONG);
74: BOOL FAR PASCAL About(HWND, unsigned, WORD, LONG);
75: BOOL FAR PASCAL EditTextProc(HWND, unsigned, WORD, LONG);
76: void OutOfMemory(void);

1: NAME         MBTEST
 2:
 3: DESCRIPTION  'Sample Microsoft Windows Application'
 4:
 5: EXETYPE      WINDOWS
 6:
 7: STUB         'WINSTUB.EXE'
 8:
 9: CODE         PRELOAD MOVEABLE DISCARDABLE
10: DATA         PRELOAD MOVEABLE MULTIPLE
11:
12: HEAPSIZE     1024
13: STACKSIZE    5120
14:
15: EXPORTS
```

```
16:     MainWndProc    @1
17:     About          @2
18:     EditTextProc   @3

1: #include "windows.h"
 2: #include "mbres.h"
 3:
 4: MBTestMenu MENU
 5: BEGIN
 6:     POPUP          "&File"
 7:     BEGIN
 8:         MENUITEM   "&New",                 IDM_NEW        ,GRAYED
 9:         MENUITEM   "&Open...",             IDM_OPEN       ,GRAYED
10:         MENUITEM   "&Save",                IDM_SAVE       ,GRAYED
11:         MENUITEM   "Save &As...",          IDM_SAVEAS     ,GRAYED
12:         MENUITEM   "&Print",               IDM_PRINT      ,GRAYED
13:     MENUITEM       SEPARATOR
14:     MENUITEM       "E&xit",        IDM_EXIT
15:     MENUITEM       SEPARATOR
16:     MENUITEM       "&About MBTest...",IDM_ABOUT
17:     END
18:
19:     POPUP          "&Edit"
20:     BEGIN
21:         MENUITEM   "&Undo\tAlt+BkSp",      IDM_UNDO       ,GRAYED
22:         MENUITEM   SEPARATOR
23:         MENUITEM   "Cu&t\tShift+Del",      IDM_CUT        ,GRAYED
24:         MENUITEM   "&Copy\tCtrl+Ins",      IDM_COPY       ,GRAYED
25:         MENUITEM   "&Paste\tShift+Ins",    IDM_PASTE      ,GRAYED
26:         MENUITEM   "&Delete\tDel",         IDM_CLEAR
27:     END
28:
29:     POPUP   "&Add"
30:     BEGIN
31:     MENUITEM       "&Rectangle",   IDM_ARECT
32:     MENUITEM       "&Text",        IDM_ATEXT
33:     MENUITEM       "&Placement Block", IDM_APBLK
34:     MENUITEM       "&Master Text Block", IDM_AMTBLK
35:     END
36:     POPUP   "&View"
37:     BEGIN
38:     MENUITEM       "&Presentation Pages", IDM_VPPGS
39:     MENUITEM       "&Master Pages",       IDM_VMPGS
40:     MENUITEM       SEPARATOR
41:     MENUITEM       "Pre&vious Page",      IDM_VPREVPG
42:     MENUITEM       "&Next Page",          IDM_VNEXTPG
43:     MENUITEM       SEPARATOR
44:     MENUITEM       "Page &1", IDM_PAGE1
45:     MENUITEM       "Page &2", IDM_PAGE2
46:     MENUITEM       "Page &3", IDM_PAGE3
47:     MENUITEM       "Page &4", IDM_PAGE4
48:     END
49:     POPUP   "&Page"
50:     BEGIN
51:     MENUITEM       "&New", IDM_PNEW
52:     MENUITEM       "&Delete", IDM_PDELETE
53:     END
54:     POPUP "&Assign Master"
55:     BEGIN
56:     MENUITEM       "&None", IDM_PMASTER0
57:     MENUITEM       "Master &1", IDM_PMASTER1
58:     MENUITEM       "Master &2", IDM_PMASTER2
59:     MENUITEM       "Master &3", IDM_PMASTER3
60:     MENUITEM       "Master &4", IDM_PMASTER4
61:     END
62:     POPUP   "&Text"
63:     BEGIN
64:     POPUP   "&Face"
65:         BEGIN
66:         MENUITEM   "&Default", IDM_FDEFAULT
67:         MENUITEM   "&Roman",   IDM_FROMAN
68:         MENUITEM   "&Swiss",   IDM_FSWISS
69:         MENUITEM   "&Modern",  IDM_FMODERN
70:         END
71:     POPUP   "&Size"
72:         BEGIN
73:         MENUITEM   "&Small",   IDM_SSMALL
74:         MENUITEM   "&Medium",  IDM_SMEDIUM
75:         MENUITEM   "&Large",   IDM_SLARGE
76:         END
77:     MENUITEM       "&Color",   IDM_SCOLOR
78:     MENUITEM       "&Edit Text", IDM_STEXT
```

```
79:       END
80: END
81:
82: MBTestAcc ACCELERATORS
83: BEGIN
84:      VK_BACK,    IDM_UNDO,   VIRTKEY, ALT
85:      VK_DELETE,  IDM_CUT,    VIRTKEY, SHIFT
86:      VK_INSERT,  IDM_COPY,   VIRTKEY, CONTROL
87:      VK_INSERT,  IDM_PASTE,  VIRTKEY, SHIFT
88:      VK_DELETE,  IDM_CLEAR,  VIRTKEY
89: END
90:
91:
92: AboutBox DIALOG 22, 17, 144, 75
93: STYLE DS_MODALFRAME | WS_CAPTION | WS_SYSMENU
94: CAPTION "About MBTest"
95: BEGIN
96:      CTEXT "Microsoft Windows"       -1,       0,  5, 144,  8
97:      CTEXT "Master Block Application" -1,      0, 14, 144,  8
98:      CTEXT "Version 3.0"             -1,       0, 34, 144,  8
99:      DEFPUSHBUTTON "OK"             IDOK,     53, 59,  32, 14,     WS_GROUP
100: END
101:
102: EditTextBox DIALOG 22, 17, 160, 75
103: STYLE DS_MODALFRAME | WS_CAPTION | WS_SYSMENU
104: CAPTION "Edit Text"
105: BEGIN
106:      LTEXT "Object text:", -1, 10, 10, 48, 8, WS_CHILD | WS_VISIBLE
107:      EDITTEXT IDC_OBJTEXT, 10, 21, 140, 12, WS_CHILD | WS_VISIBLE | ES_AUTOHSC
     ROLL | WS_TABSTOP
108:      DEFPUSHBUTTON "OK", IDOK, 110, 36, 40, 13, WS_CHILD | WS_VISIBLE | WS_GROU
     P | WS_TABSTOP
109:      PUSHBUTTON "Cancel", IDCANCEL, 110, 51, 40, 13, WS_CHILD | WS_VISIBLE | WS
     _GROUP | WS_TABSTOP
110: END
111:
```

```
1: /************************************************************************
2:
3:      PROGRAM: mbtest.c
4:
5:      PURPOSE: Demonstrates the use of Master Blocks (Placement Blocks
6:                       and Master Text Blocks)
7:
8:      DATE: 4/23/91
9:
10:     Notes:
11:        This version supports selection of more than one object at a time
12:        through the use of the right mouse button.
13:
14:        This version also supports nested masters, i.e, a master that uses
15:        a master.
16:
17: ************************************************************************/
18:
19: #include "mbtest.h"
20: #include <memory.h>
21:
22: INST    gInst;
23: PINST   pInst = &gInst;
24:
25: HANDLE  hInst;
26: HANDLE  hAccTable;
27: HWND    hwnd;
28: LOGFONT logfont;
29:
30: void CheckMBTestMenuItems( void );
31:
32: /************************************************************************
33:
34:      FUNCTION: WinMain(HANDLE, HANDLE, LPSTR, int)
35:
36:      PURPOSE: calls initialization function, processes message loop
37:
38: ************************************************************************/
39:
40: int PASCAL WinMain(HANDLE hInstance, HANDLE hPrevInstance,
41:     LPSTR lpszCmdLine, int nCmdShow)
42: {
43:     MSG msg;
44:
45:     UNUSED( lpszCmdLine );
```

```
46:     UNUSED( nCmdShow );
47:     if (!hPrevInstance)
48:         if (!InitApplication(hInstance))
49:             return (FALSE);
50:
51:     if (!InitInstance(hInstance, nCmdShow))
52:         return (FALSE);
53:
54:     while (GetMessage(&msg, NULL, NULL, NULL)) {
55:
56:     /* Only translate message if it is not an accelerator message */
57:
58:         if (!TranslateAccelerator(hwnd, hAccTable, &msg)) {
59:             TranslateMessage(&msg);
60:             DispatchMessage(&msg);
61:         }
62:     }
63:     return (msg.wParam);
64: }
65:
66:
67: /************************************************************************
68:
69:     FUNCTION: InitApplication(HANDLE)
70:
71:     PURPOSE: Initializes window data and registers window class
72:
73: ************************************************************************/
74:
75: BOOL InitApplication( HANDLE hInstance )
76: {
77:     WNDCLASS wc;
78:
79:     wc.style = NULL;
80:     wc.lpfnWndProc = MainWndProc;
81:     wc.cbClsExtra = 0;
82:     wc.cbWndExtra = 0;
83:     wc.hInstance = hInstance;
84:     wc.hIcon = LoadIcon(NULL, IDI_APPLICATION);
85:     wc.hCursor = LoadCursor(NULL, IDC_ARROW);
86:     wc.hbrBackground = GetStockObject(WHITE_BRUSH);
87:     wc.lpszMenuName =  "MBTestMenu";
88:     wc.lpszClassName = "MBTestWClass";
89:
90:     return (RegisterClass(&wc));
91: }
92:
93: /************************************************************************
94:
95:     FUNCTION:  InitInstance(HANDLE, int)
96:
97:     PURPOSE:  Saves instance handle and creates main window
98:
99: ************************************************************************/
100:
101: BOOL InitInstance( HANDLE hInstance, int nCmdShow )
102: {
103:     hInst = hInstance;
104:
105:     hAccTable = LoadAccelerators(hInst, "MBTestAcc");
106:
107:     hwnd = CreateWindow(
108:         "MBTestWClass",
109:         "MBTest Sample Application",
110:         WS_OVERLAPPEDWINDOW,
111:         CW_USEDEFAULT,
112:         CW_USEDEFAULT,
113:         CW_USEDEFAULT,
114:         CW_USEDEFAULT,
115:         NULL,
116:         NULL,
117:         hInstance,
118:         NULL
119:     );
120:
121:     if (!hwnd)
122:         return (FALSE);
123:     pInst->hInst = hInstance;
124:     pInst->hWnd = hwnd;
125:     pInst->PresPages = (PGPAGE) myAlloc( sizeof(GPAGE) );
126:     pInst->MasterPages = (PGPAGE) myAlloc( sizeof(GPAGE) );
127:     pInst->CurrPage = pInst->PresPages;
128:     pInst->CurrPPage = pInst->PresPages;
129:     pInst->CurrMPage = pInst->MasterPages;
```

```
130:        pInst->pCurrPgList = &pInst->PresPages;
131:        CheckMBTestMenuItems();
132:
133:        ShowWindow(hWnd, nCmdShow);
134:        UpdateWindow(hWnd);
135:        return (TRUE);
136:
137: }
138:
139: /****************************************************************************
140:
141:        FUNCTION: MainWndProc(HWND, unsigned, WORD, LONG)
142:
143:        PURPOSE:  Processes messages from the Windows operating environment
144:
145:        MESSAGES:
146:
147:            WM_LBUTTONDOWN - left mouse button down
148:            WM_RBUTTONDOWN - right mouse button down
149:            WM_MOUSEMOVE   - mouse move
150:            WM_LBUTTONUP   - left mouse button up
151:            WM_COMMAND     - message from menu
152:            WM_INITMENU    - initialize menu
153:            WM_PAINT       - update window
154:            WM_DESTROY     - destroy window
155:
156:        COMMENTS:
157:
158: ****************************************************************************/
159:
160: long FAR PASCAL MainWndProc(
161:     HWND hWnd,
162:     unsigned message,
163:     WORD wParam,
164:     LONG lParam)
165: {
166:     FARPROC lpProcDlg;
167:     HDC hDC;
168:     PAINTSTRUCT ps;
169:     INT hit;
170:     POINT pt;
171:     PGOBJECT pObj;
172:
173:     switch (message) {
174:
175:         case WM_LBUTTONDOWN:
176:             if (pInst->HasCapture) break;
177:             pt = MAKEPOINT( lParam );
178:             pObj = GetNextSelectedObject( pInst->CurrPage, NULL );
179:             if (!GetHitObject( pInst->CurrPage, pt, FALSE )){
180:                 if (pObj) InvalidateRect(hWnd, NULL, TRUE); /* show deselection */
181:                 break;
182:             }
183:             SetCapture( hWnd );
184:             SetCursor( LoadCursor( NULL, IDC_CROSS ));
185:             pInst->HasCapture = TRUE;
186:             hDC = GetDC( hWnd );
187:             PaintIntransitObjects( hDC, pInst->CurrPage );  /* paint */
188:             ReleaseDC( hWnd, hDC );
189:             break;
190:
191:         case WM_RBUTTONDOWN:
192:             if (pInst->HasCapture) break;
193:             pt = MAKEPOINT( lParam );
194:             if (!GetHitObject( pInst->CurrPage, pt, TRUE )) break;
195:             InvalidateRect(hWnd, NULL, TRUE);
196:             break;
197:
198:         case WM_MOUSEMOVE:
199:             if (!pInst->HasCapture) break;
200:             pt = MAKEPOINT( lParam );
201:             hDC = GetDC( hWnd );
202:             PaintIntransitObjects( hDC, pInst->CurrPage );  /* erase */
203:             MoveIntransitObjects( pInst->CurrPage, pt );
204:             PaintIntransitObjects( hDC, pInst->CurrPage );  /* repaint */
205:             if (!MultipleObjectsSelected( pInst->CurrPage )){
206:                 hit = PBLightHit( hDC, pInst->CurrPage, pt, TRUE );
207:                 hit = MTBLightHit( hDC, pInst->CurrPage, pt, (hit == 0) );
208:             }
209:             ReleaseDC( hWnd, hDC );
210:             break;
211:
```

```
212:        case WM_LBUTTONUP:
213:            if (!pInst->HasCapture) break;
214:            SetCursor( LoadCursor( NULL, IDC_ARROW ));
215:            ReleaseCapture();
216:            pInst->HasCapture = FALSE;
217:            hDC = GetDC( hWnd );
218:            PaintIntransitObjects( hDC, pInst->CurrPage ); /* erase */
219:            EndIntransitOperation( pInst->CurrPage );
220:            pt = MAKEPOINT( lParam );
221:            PBLightHit( hDC, pInst->CurrPage, pt, FALSE );
222:            MTBLightHit( hDC, pInst->CurrPage, pt, FALSE );
223:            ReleaseDC( hWnd, hDC );
224:            InvalidateRect(hWnd, NULL, TRUE);
225:            break;
226:
227:        case WM_COMMAND:
228:            switch(wParam) {
229:                case IDM_ABOUT:
230:                    lpProcDlg = MakeProcInstance(About, hInst);
231:                    DialogBox(hInst, "AboutBox", hWnd, lpProcDlg);
232:                    FreeProcInstance(lpProcDlg);
233:                    break;
234:
235:                case IDM_STEXT:
236:                    lpProcDlg = MakeProcInstance(EditTextProc, hInst);
237:                    DialogBox(hInst, "EditTextBox", hWnd, lpProcDlg);
238:                    FreeProcInstance(lpProcDlg);
239:                    break;
240:
241:                /* file menu commands */
242:
243:                case IDM_NEW:
244:                case IDM_OPEN:
245:                case IDM_SAVE:
246:                case IDM_SAVEAS:
247:                case IDM_PRINT:
248:                case IDM_UNDO:
249:                case IDM_CUT:
250:                case IDM_COPY:
251:                    MessageBox (
252:                        GetFocus ()
253:                      , "Command not implemented."
254:                      , "MBTest Sample Application"
255:                      , MB_ICONASTERISK | MB_OK
256:                    );
257:                    break;
258:
259:                case IDM_EXIT:
260:                    DestroyWindow(hWnd);
261:                    break;
262:
263:                /* edit menu commands */
264:                case IDM_CLEAR:
265:                    DeleteSelectedObjects( pInst->CurrPage );
266:                    InvalidateRect(hWnd, NULL, TRUE);
267:                    break;
268:
269:                /* view menu commands */
270:                case IDM_VMPGS:
271:                        if (*pInst->pCurrPgList != pInst->MasterPages){
272:                            pInst->pCurrPgList = &pInst->MasterPages;
273:                            pInst->CurrPPage = pInst->CurrPage;
274:                            pInst->CurrPage = pInst->CurrMPage;
275:                        InvalidateRect(hWnd, NULL, TRUE);
276:                            CheckMBTestMenuItems();
277:                        }
278:                        break;
279:                case IDM_VPPGS:
280:                        if (*pInst->pCurrPgList != pInst->PresPages){
281:                            pInst->pCurrPgList = &pInst->PresPages;
282:                            pInst->CurrMPage = pInst->CurrPage;
283:                            pInst->CurrPage = pInst->CurrPPage;
284:                        InvalidateRect(hWnd, NULL, TRUE);
285:                            CheckMBTestMenuItems();
286:                        }
287:                        break;
288:                case IDM_VNEXTPG:
289:                        if (pInst->CurrPage->NextPage)
290:                                pInst->CurrPage = pInst->CurrPage->NextPage;
291:                        else
292:                                pInst->CurrPage = *pInst->pCurrPgList;
293:                    CheckMBTestMenuItems();
```

```
294:                              InvalidateRect(hWnd, NULL, TRUE);
295:                              break;
296:                      case IDM_VPREVPG:
297:                              /* Not Implemented */
298:                              CheckMBTestMenuItems();
299:                              break;
300:
301:                      /* add menu commands */
302:                      case IDM_ARECT:
303:                              AddObject( pInst->CurrPage, OT_RECTANGLE );
304:                              break;
305:                      case IDM_ATEXT:
306:                              AddObject( pInst->CurrPage, OT_TEXT );
307:                              break;
308:                      case IDM_APBLK:
309:                              AddObject( pInst->CurrPage, OT_PLACEBLOCK );
310:                              break;
311:                      case IDM_AMTBLK:
312:                              AddObject( pInst->CurrPage, OT_MTEXTBLOCK );
313:                              break;
314:
315:                      case IDM_PNEW:
316:                              AddPage();
317:                              CheckMBTestMenuItems();
318:                              break;
319:                      case IDM_PDELETE:
320:                              /* Not Implemented */
321:                              /* DeletePage( pInst->CurrPage ); */
322:                              CheckMBTestMenuItems();
323:                              break;
324:                      case IDM_PAGE1:
325:                      case IDM_PAGE2:
326:                      case IDM_PAGE3:
327:                      case IDM_PAGE4:
328:                              GotoPage( wParam+1-IDM_PAGE1 );
329:                              CheckMBTestMenuItems();
330:                              InvalidateRect( pInst->hWnd, NULL, TRUE );
331:                              break;
332:                      case IDM_PMASTER0:
333:                      case IDM_PMASTER1:
334:                      case IDM_PMASTER2:
335:                      case IDM_PMASTER3:
336:                      case IDM_PMASTER4:
337:                              AssignMaster( pInst->CurrPage, wParam-IDM_PMASTER0 );
338:                              CheckMBTestMenuItems();
339:                              InvalidateRect( pInst->hWnd, NULL, TRUE );
340:                              break;
341:
342:                      case IDM_SSMALL:
343:                      case IDM_SMEDIUM:
344:                      case IDM_SLARGE:
345:                      case IDM_FROMAN:
346:                      case IDM_FSWISS:
347:                        case IDM_FMODERN:
348:                        case IDM_FDEFAULT:
349:                              SetTextAttrib( pInst->CurrPage, wParam );
350:                              InvalidateRect( pInst->hWnd, NULL, TRUE );
351:                              break;
352:                      default:
353:                          MessageBox (
354:                              GetFocus ()
355:                            , "Command not implemented."
356:                            , "MBTest Sample Application"
357:                            , MB_ICONASTERISK | MB_OK
358:                          );
359:                          break;
360:              }
361:              break;
362:
363:      case WM_SIZE:
364:          InvalidateRect(hWnd, NULL, TRUE);
365:          break;
366:
367:      case WM_PAINT:
368:          hDC = BeginPaint (hWnd, &ps);
369:          PaintPage( hDC, pInst->CurrPage, FALSE );
370:          EndPaint (hWnd, &ps);
371:          break;
372:
373:      case WM_DESTROY:
374:          PostQuitMessage(0);
```

```
375:            break;
376:
377:        default:
378:            return (DefWindowProc(hWnd, message, wParam, lParam));
379:        }
380:        return (NULL);
381: }
382:
383:
384: /*************************************************************************
385:
386:     FUNCTION: About(HWND, unsigned, WORD, LONG)
387:
388:     PURPOSE:  Processes messages for "About" dialog box
389:
390:     MESSAGES:
391:
392:     WM_INITDIALOG - initialize dialog box
393:     WM_COMMAND    - Input received
394:
395: *************************************************************************/
396:
397: BOOL FAR PASCAL About(HWND hDlg, unsigned message, WORD wParam,
398:                                            LONG lParam)
399: {
400:     UNUSED( lParam );
401:     switch (message) {
402:     case WM_INITDIALOG:
403:         return (TRUE);
404:
405:     case WM_COMMAND:
406:         if (wParam == IDOK
407:                 || wParam == IDCANCEL) {
408:             EndDialog(hDlg, TRUE);
409:             return (TRUE);
410:         }
411:         break;
412:     }
413:     return (FALSE);
414: }
415:
416: /*************************************************************************
417:
418:     FUNCTION: EditTextProc(HWND, unsigned, WORD, LONG)
419:
420:     PURPOSE:  Processes messages for "Edit Text" dialog box
421:
422:     MESSAGES:
423:
424:     WM_INITDIALOG - initialize dialog box
425:     WM_COMMAND    - Input received
426:
427: *************************************************************************/
428: BOOL FAR PASCAL EditTextProc(HWND hDlg, unsigned message, WORD wParam,
429:                                            LONG lParam)
430: {
431:     PGOBJECT pObj;
432:
433:     UNUSED( lParam );
434:     switch (message) {
435:         case WM_INITDIALOG:
436:             SendDlgItemMessage( hDlg, IDC_OBJTEXT, EM_LIMITTEXT, MAXSTRLEN-1,
    0L );
437:             pObj = GetNextSelectedObject( pInst->CurrPage, NULL );
438:             if (pObj)
439:                 SetDlgItemText( hDlg, IDC_OBJTEXT, pObj->userString );
440:             return (TRUE);
441:
442:         case WM_COMMAND:
443:             if (wParam == IDOK){
444:                 pObj = GetNextSelectedObject( pInst->CurrPage, NULL );
445:                 if (pObj){
446:                     GetDlgItemText( hDlg, IDC_OBJTEXT, pObj->userString,
447:                         MAXSTRLEN-1 );
448:                     InvalidateRect(pInst->hWnd, NULL, TRUE);
449:                 }
450:             }
451:             if (wParam == IDOK || wParam == IDCANCEL){
452:                 EndDialog(hDlg, TRUE);
453:                 return (TRUE);
454:             }
455:             break;
456:     }
```

```
457:     return (FALSE);
458: }
459:
460: /************************************************************************
461:
462:     FUNCTION: OutOfMemory(void)
463:
464:     PURPOSE: Displays warning message
465:
466: ************************************************************************/
467: void OutOfMemory(void)
468: {
469:     MessageBox(
470:         GetFocus(),
471:         "Out of Memory",
472:         NULL,
473:         MB_ICONHAND | MB_SYSTEMMODAL);
474:     return;
475: }
476:
477: /************************************************************************
478:
479:     FUNCTION: CheckMBTestMenuItems(void)
480:
481:     PURPOSE: Updates the "checking" and "unchecking" of command menus.
482:              Also updates the graying (disabling) of command menus.
483:
484: ************************************************************************/
485: void CheckMBTestMenuItems( void )
486: {
487:     WORD i;
488:     HMENU hMenu;
489:     PGPAGE pCurr,pMaster,pPage;
490:
491:     hMenu = GetMenu( pInst->hWnd );
492:     pCurr = pInst->CurrPage;
493:     pMaster = pCurr->MasterPage;
494:     CheckMenuItem( hMenu, IDM_PMASTER0, pMaster ? MF_UNCHECKED : MF_CHECKED );
495:     pPage = pInst->MasterPages;
496:     for (i=1; i<=4; i++){
497:         CheckMenuItem( hMenu, IDM_PMASTER0+i,
498:             (pMaster && pPage == pMaster) ? MF_CHECKED : MF_UNCHECKED );
499:         EnableMenuItem( hMenu, IDM_PMASTER0+i,
500:             pPage ? MF_ENABLED : MF_GRAYED );
501:         if (pPage) pPage = pPage->NextPage;
502:     }
503:     pPage = *(pInst->pCurrPgList);
504:     for (i=1; i<=4; i++){
505:         CheckMenuItem( hMenu, IDM_PAGE1-1+i,
506:             pPage == pCurr ? MF_CHECKED : MF_UNCHECKED );
507:         EnableMenuItem( hMenu, IDM_PAGE1-1+i,
508:             pPage ? MF_ENABLED : MF_GRAYED );
509:         if (pPage) pPage = pPage->NextPage;
510:     }
511:     if (pInst->pCurrPgList == &pInst->PresPages){
512:         CheckMenuItem( hMenu, IDM_VPPGS, MF_CHECKED );
513:         CheckMenuItem( hMenu, IDM_VMPGS, MF_UNCHECKED );
514:     }
515:     else{
516:         CheckMenuItem( hMenu, IDM_VPPGS, MF_UNCHECKED );
517:         CheckMenuItem( hMenu, IDM_VMPGS, MF_CHECKED );
518:     }
519: }
520:
521: void AddPage( void )
522: {
523:     PGPAGE pPage;
524:     PGPAGE FAR *pPageLst;
525:
526:     pPage = (PGPAGE) myAlloc( sizeof(GPAGE) );
527:     if (!pPage) return;
528:     pPageLst = pInst->pCurrPgList;
529:     while (*pPageLst)
530:         pPageLst = &((*pPageLst)->NextPage);
531:     pPage->NextPage = *pPageLst;
532:     *pPageLst = pPage;
533:     pInst->CurrPage = pPage;
534:     InvalidateRect( pInst->hWnd, NULL, TRUE );
535: }
536:
537:
538: void GotoPage( WORD n )
539: {
```

```
540:      PGPAGE pPage;
541:      WORD i;
542:
543:      pPage = *(pInst->pCurrPgList);
544:      for( i=1; i<n; i++ ){
545:          pPage = pPage->NextPage;
546:          if (!pPage) return;
547:      }
548:      pInst->CurrPage = pPage;
549: }
550:
551: void AssignMaster( PGPAGE pPage, WORD n )
552: {
553:      PGPAGE pMPage;
554:      WORD i;
555:
556:      MarkUsersOutofDate( pInst, pPage );
557:      if (n <= 0){
558:          pPage->MasterPage = NULL;
559:          pPage->PBsOrMTBsOutofDate = TRUE;
560:          BuildPBTables( pPage );
561:          return;
562:      }
563:      pMPage = pInst->MasterPages;
564:      for( i=1; i<n; i++ ){
565:          pMPage = pMPage->NextPage;
566:          if (!pMPage) return;
567:      }
568:      /* check for circular reference */
569:      if (pMPage == pPage || UsesThisMaster( pMPage, pPage )){
570:          MessageBox( pInst->hWnd, "Circular link attempted", NULL,
571:              MB_OK | MB_ICONEXCLAMATION );
572:          return;
573:      }
574:      pPage->MasterPage = pMPage;
575:      pPage->PBsOrMTBsOutofDate = TRUE;
576:      BuildPBTables( pPage );
577: }
578:
579: void SetTextAttrib( PGPAGE pPage, WORD i )
580: {
581:      PGOBJECT pObj;
582:      WORD size = 0;
583:      WORD face = 0;
584:      BOOL bSize = FALSE;
585:
586:      switch( i ){
587:          case IDM_SSMALL:    size = 1;   break;
588:          case IDM_SMEDIUM:   size = 24;  break;
589:          case IDM_SLARGE:    size = 32;  break;
590:          case IDM_FROMAN:    face = FF_ROMAN;    break;
591:          case IDM_FSWISS:    face = FF_SWISS;    break;
592:          case IDM_FMODERN:   face = FF_MODERN;   break;
593:          case IDM_FDEFAULT:  face = 0;   break;
594:      }
595:      if (size) bSize = TRUE;
596:      if (size==1) size = 0;
597:
598:      pObj = GetNextSelectedObject( pPage, NULL );
599:      while (pObj){
600:          if (bSize) pObj->size = size;
601:          else pObj->face = face;
602:          PBObjectEdited( pInst, pPage, pObj );
603:          pObj = GetNextSelectedObject( pPage, pObj );
604:      }
605: }
606:
607: BOOL GetHitObject( PGPAGE pPage, POINT pt, BOOL bAddToSelection )
608: {
609:      PGOBJECT pObj,pObjCopy;
610:
611:      /* find the LAST object in the list that pt hits */
612:      pPage->HitObject = NULL;
613:      pObj = pPage->FirstObject;
614:      while (pObj){
615:          if (PtInRect( &pObj->ObjectDimensions, pt )){
616:              pPage->HitObject = pObj;
617:          }
618:          pObj = pObj->NextObject;
619:      }
620:      pObj = pPage->HitObject;
621:      if (!pObj){
622:          if (!bAddToSelection) DeselectAllObjects( pPage );
```

```
623:          return( FALSE );
624:      }
625:      if (!pObj->ObjectSelected){
626:          if (!bAddToSelection) DeselectAllObjects( pPage );
627:          pObj->ObjectSelected = TRUE;
628:      }
629:      else if (bAddToSelection)
630:          pObj->ObjectSelected = FALSE;
631:      if (bAddToSelection) return( TRUE );
632:
633:      pObj = GetNextSelectedObject( pPage, NULL );
634:      while (pObj){
635:          pObjCopy = CopyObject( pPage, pObj, TRUE );
636:          pObjCopy->NextObject = pPage->FirstIntransitObject;
637:          pPage->FirstIntransitObject = pObjCopy;
638:          pObj = GetNextSelectedObject( pPage, pObj );
639:      }
640:
641:      pInst->OrigPt = pt;
642:      pInst->PrevPt = pt;
643:      return( TRUE );
644: }
645:
646: void EndIntransitOperation( PGPAGE pPage )
647: {
648:      PGOBJECT pObj, pIntransObj;
649:      POINT shift;
650:
651:      shift.x = pInst->PrevPt.x - pInst->OrigPt.x;
652:      shift.y = pInst->PrevPt.y - pInst->OrigPt.y;
653:      pIntransObj = pPage->FirstIntransitObject;
654:      pObj = GetNextSelectedObject( pPage, NULL );
655:      while (pObj && pIntransObj){
656:
657:          MoveSizeObject( pPage, pObj, shift );
658:          PBObjectMoved( pInst, pPage, pObj, pInst->PrevPt );
659:          PBObjectEdited( pInst, pPage, pObj );
660:
661:          pObj = GetNextSelectedObject( pPage, pObj );
662:          pIntransObj = pIntransObj->NextObject;
663:          DelObject( &pPage->FirstIntransitObject, pPage->FirstIntransitObject )
664:      }
665: }
666:
667: void MoveIntransitObjects( PGPAGE pPage, POINT pt )
668: {
669:      POINT shift;
670:      PGOBJECT pObj;
671:
672:      shift.x = pt.x - pInst->PrevPt.x;
673:      shift.y = pt.y - pInst->PrevPt.y;
674:      pObj = pPage->FirstIntransitObject;
675:      while (pObj){
676:          MoveSizeObject( pPage, pObj, shift );
677:          pObj = pObj->NextObject;
678:      }
679:      pInst->PrevPt = pt;
680: }
681:
682: void MoveSizeObject( PGPAGE pPage, PGOBJECT pObj, POINT pt )
683: {
684:      UNUSED( pPage );
685:
686:      pObj->ObjectDimensions.left += pt.x;
687:      pObj->ObjectDimensions.right += pt.x;
688:      pObj->ObjectDimensions.top += pt.y;
689:      pObj->ObjectDimensions.bottom += pt.y;
690: }
691:
692: void DelObject( PGOBJECT FAR *pObjList, PGOBJECT pObj )
693: {
694:      if (pObjList){
695:          while (*pObjList && *pObjList != pObj)
696:              pObjList = &((*pObjList)->NextObject);
697:          if (*pObjList == pObj){
698:              *pObjList = pObj->NextObject;
699:          }
700:      }
701:      myFree( pObj );
702: }
703:
704: void DeselectAllObjects( PGPAGE pPage )
705: {
```

```
706:        PGOBJECT pObj;
707:
708:        pObj = pPage->FirstObject;
709:        while (pObj){
710:            pObj->ObjectSelected = FALSE;
711:            pObj = pObj->NextObject;
712:        }
713: }
714:
715: PGOBJECT CopyObject( PGPAGE pPage, PGOBJECT pObj, BOOL Intransit )
716: {
717:        PGOBJECT pNewObj;
718:
719:        UNUSED( pPage );
720:        UNUSED( Intransit );
721:        pNewObj = (PGOBJECT) myAlloc( sizeof(GOBJECT) );
722:        *pNewObj = *pObj;
723:        pNewObj->NextObject = NULL;
724:        return( pNewObj );
725: }
726:
727: void AddObject( PGPAGE pPage, INT ObjectType )
728: {
729:        PGOBJECT pObj,pNewObj;
730:
731:        UNUSED( ObjectType );
732:        pObj = pPage->FirstObject;
733:        pNewObj = (PGOBJECT) myAlloc( sizeof(GOBJECT) );
734:        if (!pNewObj) return;
735:        pNewObj->ObjectType = ObjectType;
736:        SetRect( &pNewObj->ObjectDimensions, 20, 20, 100, 100 );
737:        switch( ObjectType ){
738:            case OT_MTEXTBLOCK:
739:                strcpy( pNewObj->userString, "Place or Enter Text Here" );
740:                break;
741:            case OT_PLACEBLOCK:
742:                strcpy( pNewObj->userString, "Place Graphic Here" );
743:                break;
744:            case OT_TEXT:
745:                strcpy( pNewObj->userString, "User Text" );
746:                break;
747:        }
748:        pNewObj->ObjectSelected = TRUE;
749:
750:        DeselectAllObjects( pPage );
751:
752:        /* add the new object to the end of the list */
753:        if (pPage->FirstObject){
754:            pObj = pPage->FirstObject;
755:            while (pObj->NextObject) pObj = pObj->NextObject;
756:            pObj->NextObject = pNewObj;
757:        }
758:        else pPage->FirstObject = pNewObj;
759:
760:        PBObjectEdited( pInst, pPage, pNewObj );
761:        InvalidateRect( pInst->hWnd, NULL, TRUE );
762: }
763:
764: void DeleteSelectedObjects( PGPAGE pPage )
765: {
766:        PGOBJECT pObj,pNextObj;
767:
768:        pObj = GetNextSelectedObject( pPage, NULL );
769:        while (pObj){
770:            pNextObj = GetNextSelectedObject( pPage, pObj );
771:            PBObjectEdited( pInst, pPage, pObj );
772:            UnlinkObj( pPage, pObj, FALSE );
773:            DelObject( &pPage->FirstObject, pObj );
774:            pObj = pNextObj;
775:        }
776: }
777:
778: void PaintIntransitObject( HDC hdc, HPEN hPen, PGOBJECT pObj )
779: {
780:        UNUSED( hPen );
781:        if (!pObj) return;
782:        switch( pObj->ObjectType ){
783:            case OT_MTEXTBLOCK:
784:            case OT_PLACEBLOCK:
785:            case OT_TEXT:
786:            case OT_RECTANGLE:
787:                Rectangle( hdc,
788:                    pObj->ObjectDimensions.left,
```

```
789:                pObj->ObjectDimensions.top,
790:                pObj->ObjectDimensions.right,
791:                pObj->ObjectDimensions.bottom);
792:        break;
793:    }
794: }
795:
796: void HighlightObj( HDC hdc, PGOBJECT pObj, INT hiliteStyle )
797: {
798:    HPEN hPen;
799:    RECT rect;
800:
801:    if (pObj->Highlight & hiliteStyle) return;   /* already hilighted */
802:
803:    SelectObject( hdc, GetStockObject( NULL_BRUSH ));
804:    hPen = CreatePen( PS_DASH, 1, 0L );
805:    SelectObject( hdc, hPen );
806:    SetROP2( hdc, R2_NOT );
807:
808:    rect = pObj->ObjectDimensions;
809:    InflateRect( &rect, HIGHLIGHT_SIZE, HIGHLIGHT_SIZE );
810:
811:    Rectangle( hdc,
812:        rect.left,
813:        rect.top,
814:        rect.right,
815:        rect.bottom);
816:    SetROP2( hdc, R2_COPYPEN );
817:    SelectObject( hdc, GetStockObject( BLACK_PEN ));
818:    DeleteObject( hPen );
819:    pObj->Highlight |= hiliteStyle;
820: }
821:
822: void UnhighlightObj( HDC hdc, PGOBJECT pObj, INT hiliteStyle )
823: {
824:    HPEN hPen;
825:    RECT rect;
826:
827:    if (!(pObj->Highlight & hiliteStyle)) return;   /* already unhilighted */
828:
829:    SelectObject( hdc, GetStockObject( NULL_BRUSH ));
830:    hPen = CreatePen( PS_DASH, 1, 0L );
831:    SelectObject( hdc, hPen );
832:    SetROP2( hdc, R2_NOT );
833:
834:    rect = pObj->ObjectDimensions;
835:    InflateRect( &rect, HIGHLIGHT_SIZE, HIGHLIGHT_SIZE );
836:
837:    Rectangle( hdc,
838:        rect.left,
839:        rect.top,
840:        rect.right,
841:        rect.bottom);
842:    SetROP2( hdc, R2_COPYPEN );
843:    SelectObject( hdc, GetStockObject( BLACK_PEN ));
844:    DeleteObject( hPen );
845:    pObj->Highlight &= ~hiliteStyle;
846: }
847:
848: void PaintObjectHilight( HDC hdc, PGOBJECT pObj )
849: {
850:    INT i;
851:    HPEN hPen;
852:    RECT rect;
853:
854:    if (!pObj) return;
855:    if (!pObj->ObjectSelected) return;
856:    hPen = CreatePen( PS_DASH, 1, 0L );
857:    SetROP2( hdc, R2_NOT );
858:    switch( pObj->ObjectType ){
859:        case OT_MTEXTBLOCK:
860:        case OT_PLACEBLOCK:
861:        case OT_TEXT:
862:        case OT_RECTANGLE:
863:            for (i=1; i<=4; i++){
864:                GetCtrlRect( &pObj->ObjectDimensions, i, &rect );
865:                FillRect( hdc, &rect, GetStockObject( BLACK_BRUSH ));
866:            }
867:            break;
868:    }
869:    SetROP2( hdc, R2_COPYPEN );
870: }
871:
872: void PaintObject( HDC hdc, PGOBJECT pObj, BOOL skipMasterObjs )
```

```
873: {
874:     HFONT hFont = 0;
875:     BOOL stockFont;
876:     char outStr[ MAXSTRLEN ];
877:
878:     if (!pObj) return;
879:
880:     logfont.lfHeight = pObj->size;
881:     logfont.lfPitchAndFamily = (BYTE)(pObj->face);
882:     logfont.lfQuality = PROOF_QUALITY;
883:
884:     stockFont = (!logfont.lfHeight && !logfont.lfPitchAndFamily);
885:     if (stockFont)
886:         SelectObject( hdc, GetStockObject( SYSTEM_FONT ));
887:     else
888:         hFont = SelectObject( hdc, CreateFontIndirect( &logfont ));
889:
890:     strcpy( outStr, "\n" );
891:     strcat( outStr, pObj->userString );
892:
893:     switch( pObj->ObjectType ){
894:         case OT_MTEXTBLOCK:
895:         case OT_PLACEBLOCK:
896:             if (skipMasterObjs) return;
897:             SelectObject( hdc, GetStockObject( BLACK_PEN ));
898:             FrameRect( hdc, &pObj->ObjectDimensions, GetStockObject( BLACK_BRUSH ));
899:             MoveTo( hdc, pObj->ObjectDimensions.left, pObj->ObjectDimensions.top );
900:             LineTo( hdc, pObj->ObjectDimensions.right, pObj->ObjectDimensions.bottom );
901:             MoveTo( hdc, pObj->ObjectDimensions.left, pObj->ObjectDimensions.bottom );
902:             LineTo( hdc, pObj->ObjectDimensions.right, pObj->ObjectDimensions.top );
903:             SelectObject( hdc, GetStockObject( BLACK_PEN ));
904:             DrawText( hdc,
905:                 outStr,
906:                 -1,
907:                 &pObj->ObjectDimensions,
908:                 DT_CENTER | DT_VCENTER | DT_WORDBREAK );
909:             break;
910:         case OT_TEXT:
911:             FrameRect( hdc, &pObj->ObjectDimensions, GetStockObject( BLACK_BRUSH ));
912:             DrawText( hdc,
913:                 outStr,
914:                 -1,
915:                 &pObj->ObjectDimensions,
916:                 DT_CENTER | DT_VCENTER | DT_WORDBREAK );
917:             break;
918:         case OT_RECTANGLE:
919:             FillRect( hdc, &pObj->ObjectDimensions, GetStockObject( GRAY_ ));
920:             FrameRect( hdc, &pObj->ObjectDimensions, GetStockObject( BLACK_BRUSH ));
921:             break;
922:     }
923:     if (!stockFont) DeleteObject( SelectObject( hdc, hFont ));
924: }
925:
926: void PaintIntransitObjects( HDC hdc, PGPAGE pPage )
927: {
928:     PGOBJECT pObj;
929:     HPEN hPen;
930:
931:     if (!pPage) return;
932:
933:     hPen = CreatePen( PS_DASH, 1, 0L );
934:     SelectObject( hdc, hPen );
935:     SelectObject( hdc, GetStockObject( NULL_BRUSH ));
936:     SetROP2( hdc, R2_NOT );
937:     pObj = pPage->FirstIntransitObject;
938:     while (pObj){
939:         PaintIntransitObject( hdc, hPen, pObj );
940:         pObj = pObj->NextObject;
941:     }
942:     SetROP2( hdc, R2_COPYPEN );
943:     SelectObject( hdc, GetStockObject( BLACK_PEN ));
944:     DeleteObject( hPen );
945: }
946:
947: void PaintEmptyMasterObjects( HDC hdc, PGPAGE pPage )
948: {
```

```
949:    INT i;
950:    for (i=1; i<=pPage->nPB; i++){
951:        if (!pPage->PBTable[ i ].pLocObj)
952:            PaintObject( hdc, pPage->PBTable[ i ].pPBObj, FALSE );
953:    }
954:    for (i=1; i<=pPage->nMTB; i++){
955:        if (!pPage->MTBTable[ i ].pLocObj)
956:            PaintObject( hdc, pPage->MTBTable[ i ].pPBObj, FALSE );
957:    }
958:
959: }
960:
961: void PaintPage( HDC hdc, PGPAGE pPage, BOOL isMaster )
962: {
963:    PGOBJECT pObj;
964:
965:    if (!pPage) return;
966:    if (pPage->PBsOrMTBsOutofDate)
967:        BuildPBTables( pPage );
968:    PaintPage( hdc, pPage->MasterPage, TRUE );
969:    pObj = pPage->FirstObject;
970:    while (pObj){
971:        PaintObject( hdc, pObj, isMaster );
972:        pObj = pObj->NextObject;
973:    }
974:    if (isMaster) return;   /* don't paint master page's highlighting */
975:    PaintEmptyMasterObjects( hdc, pPage );
976:    pObj = pPage->FirstObject;
977:    while (pObj){
978:        PaintObjectHilight( hdc, pObj );
979:        pObj = pObj->NextObject;
980:    }
981:    PaintIntransitObjects( hdc, pPage );
982: }
983:
984: /* returns TRUE if more than one object is selected */
985: BOOL MultipleObjectsSelected( PGPAGE pPage )
986: {
987:    PGOBJECT pObj;
988:
989:    pObj = GetNextSelectedObject( pPage, NULL );
990:    return( pObj && GetNextSelectedObject( pPage, pObj ));
991: }
992:
993: PGOBJECT GetNextSelectedObject( PGPAGE pPage, PGOBJECT pObj )
994: {
995:    if (!pObj) pObj = pPage->FirstObject;
996:    else pObj = pObj->NextObject;
997:    while (pObj && !pObj->ObjectSelected)
998:        pObj = pObj->NextObject;
999:    return( pObj );
1000: }
1001:
1002: void GetCtrlRect( LPRECT pObjRect, INT i, LPRECT pCtrlRect )
1003: {
1004:    switch( i ){
1005:        case 1:
1006:            pCtrlRect->left = pObjRect->left;
1007:            pCtrlRect->top = pObjRect->top;
1008:            break;
1009:        case 2:
1010:            pCtrlRect->left = pObjRect->right;
1011:            pCtrlRect->top = pObjRect->top;
1012:            break;
1013:        case 3:
1014:            pCtrlRect->left = pObjRect->right;
1015:            pCtrlRect->top = pObjRect->bottom;
1016:            break;
1017:        case 4:
1018:            pCtrlRect->left = pObjRect->left;
1019:            pCtrlRect->top = pObjRect->bottom;
1020:            break;
1021:    }
1022:    pCtrlRect->right = pCtrlRect->left;
1023:    pCtrlRect->bottom = pCtrlRect->top;
1024:    InflateRect( pCtrlRect, HIGHLIGHT_SIZE, HIGHLIGHT_SIZE );
1025: }
1026:
1027:
```

```
 1: /************************************************************************
 2:
 3:      FILE: mb.c
 4:
 5:      PURPOSE: Contains the main code that implements Master Blocks
 6:               (Placement Blocks and Master Text Blocks)
 7:
 8:      DATE: 4/23/91
 9:
10: ************************************************************************/
11:
12: #include "mbtest.h"
13:
14: void PBResizeObject( PGPAGE pPage, PGOBJECT pObj );
15: void MTBCopyInfoToObject( PGPAGE pPage, PGOBJECT pObj );
16:
17: /*+----------------------------------------------------------------
18: UnlinkObj -
19:      Unlinks an object from any PB or MTB. Either eliminates the link
20:      completely or, if makeDormant is true, makes the link dormant.
21:      This routine may be called even a dormant link or no link at all
22:      exists.
23: */
24: void UnlinkObj( PGPAGE pPage, PGOBJECT pObj, BOOL makeDormant )
25: {
26:      INT index;
27:
28:      index = pObj->PB_id;
29:      if (index){
30:           if (makeDormant)
31:                pObj->PB_id = pObj->PB_id | DORMANT_FLAG;
32:           else
33:                pObj->PB_id = 0;
34:
35:           if (!(index & DORMANT_FLAG) && index <= pPage->nPB)
36:                pPage->PBTable[ index ].pLocObj = NULL;
37:      }
38:      index = pObj->MTB_id;
39:      if (index){
40:           if (makeDormant)
41:                pObj->MTB_id = pObj->MTB_id | DORMANT_FLAG;
42:           else
43:                pObj->MTB_id = 0;
44:
45:           if (!(index & DORMANT_FLAG) && index <= pPage->nMTB)
46:                pPage->MTBTable[ index ].pLocObj = NULL;
47:      }
48: }
49:
50: /*+----------------------------------------------------------------
51: PBLink -
52:      Links an object to a PB. "Index" indicates which PB to link to.
53:      pPage must be the page that pObj resides on. If pObj is linked
54:      to another PM or MTB, that link is removed first.
55: */
56: void PBLink( PGPAGE pPage, PGOBJECT pObj, INT index )
57: {
58:      if (index > pPage->nPB) return;
59:      UnlinkObj( pPage, pObj, FALSE );
60:      pPage->PBTable[ index ].pLocObj = pObj;
61:      pObj->PB_id = index;
62:      PBResizeObject( pPage, pObj );
63: }
64:
65: /*+----------------------------------------------------------------
66: PBResizeObject -
67:      As part of linking an object to a PB, the object takes on the size
68:      and location of the PB.
69: */
70: void PBResizeObject( PGPAGE pPage, PGOBJECT pObj )
71: {
72:      PGOBJECT pPBObj;
73:
74:      pPBObj = pPage->PBTable[ pObj->PB_id ].pPBObj;
75:      pObj->ObjectDimensions = pPBObj->ObjectDimensions;
76: }
77:
78: /*+----------------------------------------------------------------
79: MTBLink -
80:      Links an object to an MTB. "Index" indicates which MTB to link to.
81:      pPage must be the page that pObj resides on. If pObj is linked
82:      to another PM or MTB, that link is removed first.
83: */
```

```
 84: void MTBLink( PGPAGE pPage, PGOBJECT pObj, INT index )
 85: {
 86:     if (index > pPage->nMTB) return;
 87:     UnlinkObj( pPage, pObj, FALSE );
 88:     pPage->MTBTable[ index ].pLocObj = pObj;
 89:     pObj->MTB_id = index;
 90:     MTBCopyInfoToObject( pPage, pObj );
 91: }
 92:
 93: /*+-------------------------------------------------------------
 94: MTBCopyInfoToObject -
 95:     As part of linking an object to a MTB, the object takes on the size,
 96:     location, and attributes of the MTB, but NOT the content (the text).
 97: */
 98: void MTBCopyInfoToObject( PGPAGE pPage, PGOBJECT pObj )
 99: {
100:     PGOBJECT pPBObj;
101:
102:     pPBObj = pPage->MTBTable[ pObj->MTB_id ].pPBObj;
103:     pObj->ObjectDimensions = pPBObj->ObjectDimensions;
104:     pObj->size = pPBObj->size;         /* font size */
105:     pObj->face = pPBObj->face;         /* choice of typeface */
106: }
107:
108: /*+-------------------------------------------------------------
109: FreePBTables -
110:     This routine is called as part of replacing the master for a page.
111:     It dormant-unlinks any objects on the page that are in PBs or MTBs,
112:     and then frees that tables that contain PB and MTB info for the
113:     current master.
114: */
115: void FreePBTables( PGPAGE pPage )
116: {
117:     PGOBJECT pObj;
118:
119:     if (!pPage->PBTable && !pPage->MTBTable) return;
120:     pObj = pPage->FirstObject;
121:
122:     /* make dormant any objects that are in PBs or MTBs */
123:     while( pObj ){
124:         UnlinkObj( pPage, pObj, TRUE );
125:         pObj = pObj->NextObject;
126:     }
127:
128:     if (pPage->PBTable){
129:         myFree( pPage->PBTable );
130:         pPage->PBTable = NULL;
131:         pPage->nPB = 0;
132:     }
133:
134:     if (pPage->MTBTable){
135:         myFree( pPage->MTBTable );
136:         pPage->MTBTable = NULL;
137:         pPage->nMTB = 0;
138:     }
139: }
140:
141: /*+-------------------------------------------------------------
142: BuildPBTables -
143:     This routine is called as part of replacing the master for a page.
144:     It frees any existing PBTables and then builds new ones for based
145:     on the current master page.  The caller is responsible for seeing
146:     that pPage->MasterPage points to the master that should be used to
147:     build new tables.
148: */
149: void BuildPBTables( PGPAGE pPage )
150: {
151:     INT i;
152:     INT nPB = 0;
153:     INT nMTB = 0;
154:     PGOBJECT pObj;
155:     PGPAGE pmaster = pPage->MasterPage;
156:
157:     FreePBTables( pPage );
158:     if (pmaster && pmaster->PBsOrMTBsOutofDate) BuildPBTables( pmaster );
159:     pPage->PBsOrMTBsOutofDate = FALSE;
160:     if (!pmaster) return;
161:
162:     /* first count empty PBs and MTBs available on the master page */
163:     for (i=1; i<=pmaster->nPB; i++ )
164:         if (!pmaster->PBTable[i].pLocObj) nPB++;
165:     for (i=1; i<=pmaster->nMTB; i++ )
166:         if (!pmaster->MTBTable[i].pLocObj) nMTB++;
```

```
167:
168:        /* now add the PBs and MTBs actually on the master page */
169:        pObj = pmaster->FirstObject;
170:        while( pObj ){
171:            if (pObj->ObjectType == OT_PLACEBLOCK) nPB++;
172:            if (pObj->ObjectType == OT_MTEXTBLOCK) nMTB++;
173:            pObj = pObj->NextObject;
174:        }
175:
176:        /* now allocate the proper size tables */
177:        pPage->PBTable = myAlloc( (nPB+1) * sizeof( PBTABLE ));
178:        pPage->nPB = nPB;
179:        pPage->MTBTable = myAlloc( (nMTB+1) * sizeof( PBTABLE ));
180:        pPage->nMTB = nMTB;
181:
182:        /* now fill the tables in with info from the master */
183:        nPB = 0;
184:        nMTB = 0;
185:        /* first do empty PBs and MTBs available on the master page */
186:        for (i=1; i<=pmaster->nPB; i++ ){
187:            if (!pmaster->PBTable[i].pLocObj){
188:                nPB++;
189:                pPage->PBTable[ nPB ] = pmaster->PBTable[ i ];
190:            }
191:        }
192:        for (i=1; i<=pmaster->nMTB; i++ ){
193:            if (!pmaster->MTBTable[i].pLocObj){
194:                nMTB++;
195:                pPage->MTBTable[ nMTB ] = pmaster->MTBTable[ i ];
196:            }
197:        }
198:        /* now do the PBs and MTBs actually on the master page */
199:        pObj = pmaster->FirstObject;
200:        while( pObj ){
201:            if (pObj->ObjectType == OT_PLACEBLOCK){
202:                nPB++;
203:                pPage->PBTable[ nPB ].pPBObj = pObj;
204:                pPage->PBTable[ nPB ].PBRect = pObj->ObjectDimensions;
205:                pPage->PBTable[ nPB ].pPBPage = pmaster;
206:            }
207:            if (pObj->ObjectType == OT_MTEXTBLOCK){
208:                nMTB++;
209:                pPage->MTBTable[ nMTB ].pPBObj = pObj;
210:                pPage->MTBTable[ nMTB ].PBRect = pObj->ObjectDimensions;
211:                pPage->MTBTable[ nMTB ].pPBPage = pmaster;
212:            }
213:            pObj = pObj->NextObject;
214:        }
215:
216:        /* associate (link) any dormant-associated objects */
217:        pObj = pPage->FirstObject;
218:        while( pObj ){
219:            if (pObj->PB_id != 0){
220:                PBLink( pPage, pObj, pObj->PB_id & (-DORMANT_FLAG));
221:            }
222:            if (pObj->MTB_id != 0){
223:                MTBLink( pPage, pObj, pObj->MTB_id & (-DORMANT_FLAG));
224:            }
225:            pObj = pObj->NextObject;
226:        }
227: }
228:
229: /*+-----------------------------------------------------------------
230: PBLightHit -
231:     This routine is called while an object is in the process of being
232:     moved. It highlights the PB (if any) that the object is being
233:     dragged into and unhighlights the PB (if any) that the object is
234:     being dragged out of.
235:
236:     pt is the current mouse location (or equivalent).
237:     pPage is the current page being edited. pPage->HitObject must point to
238:     the object being moved.
239:
240:     If hilite is FALSE, then ALL PBs are unhighlighted.
241: */
242: INT PBLightHit( HDC hdc, PGPAGE pPage, POINT pt, BOOL hilite )
243: {
244:     PGOBJECT pSelObj;
245:     INT index;
246:     INT hit = 0;
247:
248:     if (!pPage) return( 0 );
249:     pSelObj = pPage->HitObject;
250:     hit = PBHit( pPage, pSelObj, pt );
```

```
251:
252:        for (index = pPage->nPB; index >= 1; index--){
253:            if (hilite && index == hit)
254:                HighlightObj( hdc, pPage->PBTable[ index ].pPBObj, HILITE_PB );
255:            else
256:                UnhighlightObj( hdc, pPage->PBTable[ index ].pPBObj, HILITE_PB );
257:        }
258:        return( hit );
259: }
260:
261: /*+-----------------------------------------------------------------
262: PBHit -
263:     This routine returns the index of the PB that an object should be
264:     linked to if it is dragged to location "pt."  If there is no empty
265:     PB at that location, then 0 is returned.
266: */
267: INT PBHit( PGPAGE pPage, PGOBJECT pSelObj, POINT pt )
268: {
269:        PGOBJECT pLocObj;
270:        INT index;
271:        INT hit = 0;
272:
273:        if (!pPage) return( 0 );
274:
275:        /* PBs and MTBs can't go into a PB */
276:        if (pSelObj->ObjectType == OT_MTEXTBLOCK
277:                || pSelObj->ObjectType == OT_PLACEBLOCK)
278:            return( 0 );
279:
280:        for (index = pPage->nPB; index >= 1; index--){
281:            pLocObj = pPage->PBTable[ index ].pLocObj;
282:            if (pLocObj && pLocObj != pSelObj) continue;       /* pb already in u
       se */
283:            if (PtInRect( &(pPage->PBTable[index].PBRect), pt ))
284:                return( index );
285:        }
286:        return( 0 );
287: }
288:
289: /*+-----------------------------------------------------------------
290: MTBLightHit -
291:     This routine is called while an object is in the process of being
292:     moved.  It highlights the MTB (if any) that the object is being
293:     dragged into and unhighlights the MTB (if any) that the object is
294:     being dragged out of.
295:
296:     pt is the current mouse location (or equivalent).
297:     pPage  is the current page being edited.  pPage->HitObject must point to
298:     the object being moved.
299:
300:     If hilite is FALSE, then ALL MTBs are unhighlighted.
301: */
302: INT MTBLightHit( HDC hdc, PGPAGE pPage, POINT pt, BOOL hilite )
303: {
304:        PGOBJECT pSelObj;
305:        INT index;
306:        INT hit = 0;
307:
308:        if (!pPage) return( 0 );
309:        pSelObj = pPage->HitObject;
310:        hit = MTBHit( pPage, pSelObj, pt );
311:
312:        for (index = pPage->nMTB; index >= 1; index--){
313:            if (hilite && index == hit)
314:                HighlightObj( hdc, pPage->MTBTable[ index ].pPBObj, HILITE_PB );
315:            else
316:                UnhighlightObj( hdc, pPage->MTBTable[ index ].pPBObj, HILITE_PB );
317:        }
318:        return( hit );
319: }
320:
321: /*+-----------------------------------------------------------------
322: MTBHit -
323:     This routine returns the index of the PB that an object should be
324:     linked to if it is dragged to location "pt."  If there is no empty
325:     PB at that location, then 0 is returned.
326: */
327: INT MTBHit( PGPAGE pPage, PGOBJECT pSelObj, POINT pt )
328: {
329:        PGOBJECT pLocObj;
330:        INT index;
331:        INT hit = 0;
332:
```

```
333:        if (!pPage) return( 0 );
334:
335:        /* only OT_TEXT can go into an MTB */
336:        if (pSelObj->ObjectType != OT_TEXT) return( 0 );
337:
338:        for (index = pPage->nMTB; index >= 1; index--){
339:            pLocObj = pPage->MTBTable[ index ].pLocObj;
340:            if (pLocObj && pLocObj != pSelObj) continue;     /* MTB already in use */
341:            if (PtInRect( &(pPage->MTBTable[index].PBRect), pt ))
342:                return( index );
343:        }
344:        return( 0 );
345: }
346:
347: /*+----------------------------------------------------------------
348: PBObjectMoved -
349:     This routine is called whenever an object is moved. It checks to
350:     see whether the object has been dragged into a PB or MTB and, if so,
351:     sets up the proper link.
352:
353:     If a link is created or broken, then calls MarkUsersOutofDate to
354:     deal with nested masters.
355: */
356: void PBObjectMoved( PINST pInst, PGPAGE pPage, PGOBJECT pObj, POINT pt )
357: {
358:     INT hit;
359:     BOOL bIsActiveLinked;
360:
361:     bIsActiveLinked = (IsPBLinkedActive( pObj ) || IsMTBLinkedActive( pObj ));
362:     if (MultipleObjectsSelected( pPage )){
363:         if (bIsActiveLinked){
364:             UnlinkObj( pPage, pObj, FALSE );
365:             MarkUsersOutofDate( pInst, pPage );
366:         }
367:         return;
368:     }
369:     hit = PBHit( pPage, pObj, pt );
370:     if (hit){
371:         /* if PB link changed, mark users */
372:         if (hit != pObj->PB_id)
373:             MarkUsersOutofDate( pInst, pPage );
374:         PBLink( pPage, pObj, hit );
375:         return;
376:     }
377:     hit = MTBHit( pPage, pObj, pt );
378:     if (hit){
379:         /* if MTB link changed, mark users */
380:         if (hit != pObj->MTB_id)
381:             MarkUsersOutofDate( pInst, pPage );
382:         MTBLink( pPage, pObj, hit );
383:         return;
384:     }
385:     /* no hit, so unlink and don't make it dormant */
386:     if (bIsActiveLinked){
387:         UnlinkObj( pPage, pObj, FALSE );
388:         MarkUsersOutofDate( pInst, pPage );
389:     }
390: }
391:
392: /*+----------------------------------------------------------------
393: PBObjectEdited -
394:     This routine is called whenever an object on a master page is modified
395:     in any way. If the object happens to be a PB or MTB, then any pages
396:     that use this page as a master need to be updated.
397: */
398: void PBObjectEdited( PINST pInst, PGPAGE pMaster, PGOBJECT pObj )
399: {
400:     if (pObj->ObjectType != OT_PLACEBLOCK
401:             && pObj->ObjectType != OT_MTEXTBLOCK) return;
402:
403:     MarkUsersOutofDate( pInst, pMaster );
404: }
405:
406: /*+----------------------------------------------------------------
407: MarkUsersOutofDate -
408:     This routine is called whenever a master page is modified in such
409:     that pages that use this master should have their PBTables rebuilt.
410: */
411: void MarkUsersOutofDate( PINST pInst, PGPAGE pMaster )
412: {
413:     PGPAGE pPage;
414:     BOOL bIsMaster = FALSE;
415:
```

```
416:      pPage = pInst->MasterPages;
417:      while (pPage){
418:          if (pPage == pMaster) bIsMaster = TRUE;
419:          else if (UsesThisMaster( pPage, pMaster ))
420:              pPage->PBsOrMTBsOutofDate = TRUE;
421:          pPage = pPage->NextPage;
422:      }
423:      if (!bIsMaster) return;
424:      pPage = pInst->PresPages;
425:      while (pPage){
426:          if (UsesThisMaster( pPage, pMaster ))
427:              pPage->PBsOrMTBsOutofDate = TRUE;
428:          pPage = pPage->NextPage;
429:      }
430: }
431:
432: /*+----------------------------------------------------------------
433: IsPBLinkedActive -
434:     Returns TRUE if pObj is linked to a PB and the link is not dormant.
435: */
436: BOOL IsPBLinkedActive( PGOBJECT pObj )
437: {
438:     if (!pObj) return( FALSE );
439:     return( pObj->PB_id && !(pObj->PB_id & DORMANT_FLAG ));
440: }
441:
442: /*+----------------------------------------------------------------
443: IsPBLinkedActive -
444:     Returns TRUE if pObj is linked to an MTB and the link is not dormant.
445: */
446: BOOL IsMTBLinkedActive( PGOBJECT pObj )
447: {
448:     if (!pObj) return( FALSE );
449:     return( pObj->MTB_id && !(pObj->MTB_id & DORMANT_FLAG ));
450: }
451:
452: /*+----------------------------------------------------------------
453: UsesThisMaster -
454:     Returns TRUE if pPage references pMaster anywhere up the line.  Allows
455:     for nested masters.
456: */
457: BOOL UsesThisMaster( PGPAGE pPage, PGPAGE pMaster )
458: {
459:     PGPAGE pCurr;
460:
461:     if(!pPage) return(FALSE);
462:     pCurr = pPage->MasterPage; /* starting point */
463:     while (pCurr){
464:         if (pCurr == pMaster) break;
465:         else pCurr = pCurr->MasterPage;
466:     }
467:     return( pCurr == pMaster );
468: }
469:
470: /* stubs */
471:
472: INT CountSelectedObjects( PGPAGE pPage )
473: {
474:     UNUSED( pPage );
475:     return( 1 );
476: }
477:
478: LPVOID myAlloc( WORD size ){
479:     LOCALHANDLE hLocal;
480:     LPVOID ptr;
481:
482:     hLocal = LocalAlloc( LPTR, size );
483:     ptr = LocalLock( hLocal );
484:     return( ptr );
485: }
486:
487: void myFree( LPVOID ptr ){
488:     LOCALHANDLE hLocal;
489:
490:     hLocal = LocalHandle( LOUSHORT( (ULONG)ptr ) );
491:     LocalUnlock( hLocal );
492:     LocalFree( hLocal );
493: }
494:
495:
```

We claim:

1. A method of managing a presentation for use with a computer having a display screen and a pointing device that controls the location of a pointer on said display screen said method comprising:

representing each page of a multi-page presentation, each of said pages defining a two-dimensional work area having contents that can be modified by a user when that page is displayed on said display screen;

representing a plurality of graphical objects that form part of the contents of a selected page of said multi-page presentation, each of said plurality of graphical objects having associated therewith a user-specified size and a user-specified location on said selected page, said user-specified locations of said graphical object having an x-coordinate and a y-coordinate which are user-selectable within a two-dimensional range of coordinates, each of said graphical objects appearing on said display screen as a corresponding graphical image when said selected page is displayed on said screen and the corresponding graphical image of each of said graphical objects disappearing from said display screen when said selected page is removed from said display screen;

representing a container object that can be associated with said selected page, said container object having associated therewith a user-specified size and a user-specified location, said user-specified location of said container object being independent of said graphical objects and having an x-coordinate and a y-coordinate which are user-selectable within said two-dimensional range of coordinates, said container object having a set of user-specified visual characteristics associated therewith;

capturing a selected one of said plurality of graphical objects when said pointer has been moved to a location that lies on or within the selected graphical object;

dragging the captured graphical object to another location on said selected page;

releasing the captured graphical object at the other location; and linking said released graphical object to said container object when said captured graphical object is released in said container object, wherein said linking step creates a link between said released graphical object and said container object and imposes the set of specified visual characteristics on said released graphical object, and when imposed on said released graphical object said set of specified visual characteristics dictates the visual appearance of the graphical image corresponding to the released graphical object.

2. The method of claim 1 further comprising the step of unlinking said released graphical object from said container object when said released graphical object is dragged out of said container object, wherein the graphical image corresponding to the unlinked graphical object is then free to take on visual characteristics that are independent of said set of specified visual characteristics.

3. The method of claim 1 wherein the user-specified location of said container object on said selected page is independent of any other container objects that are associated with said selected page.

4. The method of claim 1 wherein the work area of any given page is independent of the work area of any other page.

5. The method of claim 4 wherein said linking step generates said link by marking said released graphical object as being associated with said container object.

6. The method of claim 5 wherein said container object is a placement block and said set of specified visual characteristics includes size and location and wherein said linking step imposes only the size and location characteristics of said placement block on the graphical image corresponding to said released graphical object when said released graphical object is released into said placement block.

7. The method of claim 5 wherein said container object is a text block, wherein said set of specified visual characteristics includes size, location and preselected attributes and wherein said linking step imposes said set of specified visual characteristics on the graphical image corresponding to said released graphical object when said released graphical object is released onto said text block.

8. The method of claim 7 wherein said preselected attributes include one or more features selected from a group including typeface, font size, color of text, color of background, bullet style, appearance, indents, spacing, justification, and word wrap.

9. The method of claim 7 wherein said preselected attributes include one or more features selected from a group including border color, border width and border style.

10. The method of claim 5 further comprising highlighting said container object when said captured graphical object has entered said container object.

11. The method of claim 5 wherein said dragging step comprises:

representing the captured graphical object by an intransit object;

moving said in-transit object to another location on said selected page; and releasing said in-transit object at the conclusion of a move.

12. The method of claim 11 wherein said moving step comprises:

determining whether said in-transit object has entered said container object; and highlighting said container object when said determining step determines that said in-transit object has entered said container object.

13. The method of claim 12 further comprising unhighlighting a highlighted container object when said intransit object is released into the highlighted container.

14. The method of claim 11 wherein said linking step comprises:

detecting when said releasing step has released said in-transit object;

determining whether said in-transit object has entered said container object;

repositioning said captured graphical object into said container object in response to said releasing step releasing said in-transit object and if said determining step determines that said in-transit object has entered said container object, wherein said repositioning step imposes the set of specified visual characteristics on the graphical image corresponding to said captured graphical object.

15. The method of claim 14 wherein said linking step further comprises erasing said in-transit object in response to said releasing step releasing said in-transit object.

16. The method of claim 5 wherein said container object is on a different page from said plurality of graphical objects and wherein said method further comprises assigning said different page to said selected page so that said container object as associated with said selected page.

17. The method of claim 16 further comprising disassociating said different page from said selected page so that said different page is no longer assigned to said selected page and said container object is no longer associated with said selected page.

18. The method of claim 17 wherein said disassociating step further comprises making dormant any link that any of said plurality of graphical objects may have with said container object when said disassociating step disassociates said different page from said selected page.

19. The method of claim 5 further comprising displaying said selected page wherein said display step renders the graphical images corresponding to said plurality of graphical objects visible and it renders said container object visible only when said container object is associated with said selected page and when none of said graphical objects has an active link to said container object.

20. The method of claim 19 wherein said display step further comprises rendering said container object invisible when any one of said plurality of graphical object is dragged into said container object.

* * * * *

UNITED STATES PATENT AND TRADEMARK OFFICE
CERTIFICATE OF CORRECTION

PATENT NO. : 5,416,900

DATED : May 16, 1995

INVENTOR(S) : Blanchard et al.

It is certified that error appears in the above-identified patent and that said Letters Patent is hereby corrected as shown below:

On the title page, item [54] and col. 1, line 1 should read--

Manager which Implements Containers for Graphical Objects--; please correct

Col. 3, line 40, after "function," insert a new paragraph

Col. 9, line 7, before "data" insert --instance--

Col. 9, line 40, after "of" insert --those--

Col. 11, line   replace "Objectinfo[1]" with --ObjectInfo[1]--

Col. 13, line 24, before "size" insert --*--

Col. 15, lines 59 - 60, replace "Objectinfo" with --ObjectInfo--

Col. 15, line 61, replace "Objectinfo" with --ObjectInfo--

Col. 19, line 11, replace "645" with --645.--

Col. 19, line 11, replace "described" with --described.--

UNITED STATES PATENT AND TRADEMARK OFFICE
CERTIFICATE OF CORRECTION

PATENT NO. : 5,416,900
DATED : May 16, 1995
INVENTOR(S) : William H. Blanchard, et al.

It is certified that error appears in the above-indentified patent and that said Letters Patent is hereby corrected as shown below:

Col. 71, claim 1, line 19, replace "on-said" with --on said-

Signed and Sealed this

Sixteenth Day of July, 1996

Attest:

BRUCE LEHMAN

*Attesting Officer*     *Commissioner of Patents and Trademarks*